(12) United States Patent
Nishikawa

(10) Patent No.: US 7,212,635 B2
(45) Date of Patent: May 1, 2007

(54) IMAGE PROCESSING APPARATUS, CONTROL METHOD THEREOF, AND IMAGE PROCESSING SYSTEM

(75) Inventor: Naoyuki Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 814 days.

(21) Appl. No.: 10/453,489

(22) Filed: Jun. 4, 2003

(65) Prior Publication Data

US 2003/0231770 A1    Dec. 18, 2003

(30) Foreign Application Priority Data

| Jun. 4, 2002 | (JP) | ............................. 2002-163242 |
| Jun. 4, 2002 | (JP) | ............................. 2002-163243 |
| Jun. 4, 2002 | (JP) | ............................. 2002-163244 |
| Jun. 4, 2002 | (JP) | ............................. 2002-163245 |

(51) Int. Cl.
    *H04N 1/44* (2006.01)
(52) U.S. Cl. ...................... 380/213; 380/246
(58) Field of Classification Search ................ 380/213, 380/246

See application file for complete search history.

(56) References Cited

U.S. PATENT DOCUMENTS

| 5,481,610 A |     | 1/1996  | Doiron et al.     ............... 380/270 |
| 5,581,613 A | *   | 12/1996 | Nagashima et al. ........ 380/201 |
| 6,546,129 B1 | *  | 4/2003  | Ohta et al. .................. 382/162 |
| 6,556,198 B1 |    | 4/2003  | Nishikawa ................... 345/420 |
| 6,925,205 B2 | *  | 8/2005  | Leedham et al. ........... 382/167 |
| 6,956,966 B2 | *  | 10/2005 | Steinberg ..................... 382/167 |
| 2003/0117636 A1 |  | 6/2003  | Nishikawa ................... 358/1.9 |
| 2003/0228016 A1 | * | 12/2003 | Shimada ...................... 380/213 |
| 2004/0051897 A1 | * | 3/2004  | Kakiuchi et al. ........... 358/1.14 |
| 2006/0222227 A1 | * | 10/2006 | Seul et al. ................... 382/128 |

FOREIGN PATENT DOCUMENTS

| CN | 1123591 A    | 5/1996 |
| CN | 1147741 A    | 4/1997 |
| JP | 58-173977    | 10/1983 |
| JP | 11-161167    | 6/1999 |
| JP | 11-203207    | 7/1999 |
| JP | 11-344925    | 12/1999 |
| JP | 2000-25274   | 1/2000 |
| JP | 2001-273285  | 10/2001 |
| WO | WO01/52178 A1 | 7/2001 |

OTHER PUBLICATIONS

English abstract of JPA 09-009075 (corresponding to CN 1147741 A).
(5) Eiji Okamoto, "Introduction of Encryption Theory", Kyoritsu Shuppan Co. Ltd., Feb. 25, 1993, p. 110, CS-NB-1997-00220-001(partial Englishi translation).

* cited by examiner

*Primary Examiner*—Matthew Smithers
(74) *Attorney, Agent, or Firm*—Fitzpatrick, Cella, Harper & Scinto

(57) ABSTRACT

An image processing apparatus for encrypting a profile for color matching, generates a table which stores change information of the profile, changes data in the profile on the basis of the generated table, and encrypts the table by a predetermined algorithm.

34 Claims, 19 Drawing Sheets

FIG. 3

PROFILE MANAGEMENT

RGB INPUT:

| PROFILE (filename) | PROFILE INFORMATION | UPDATE DATE |
|---|---|---|
| sRBG Monitor | DEFAULT | 2000/12/03 |
| HDTV gamma 1.6 | | 1997/11/08 |
| HDTV gamma 1.8 | | 1998/10/22 |
| HDTV gamma 2.4 | | 1999/11/12 |
| My_Monitor | LOCAL VERSION | 2000/12/01 |
| My_Monitor_1 | TEST_1 | 2001/12/03 |
| My_Monitor_2 | | 2001/12/08 |

201

| REGISTRATION | DELETE | SECURITY SETUP | BACK |
|---|---|---|---|

202  203  204  205

PROFILE MANAGEMENT : ENCRYPTION

RGB INPUT:

| PROFILE (filename) | PROFILE INFORMATION | UPDATE DATE |
|---|---|---|
| My_Monitor_1 | TEST_1 | 2001/12/03 |

| ENCRYPTION | DECRYPTION | BACK |
|---|---|---|

207  208  209

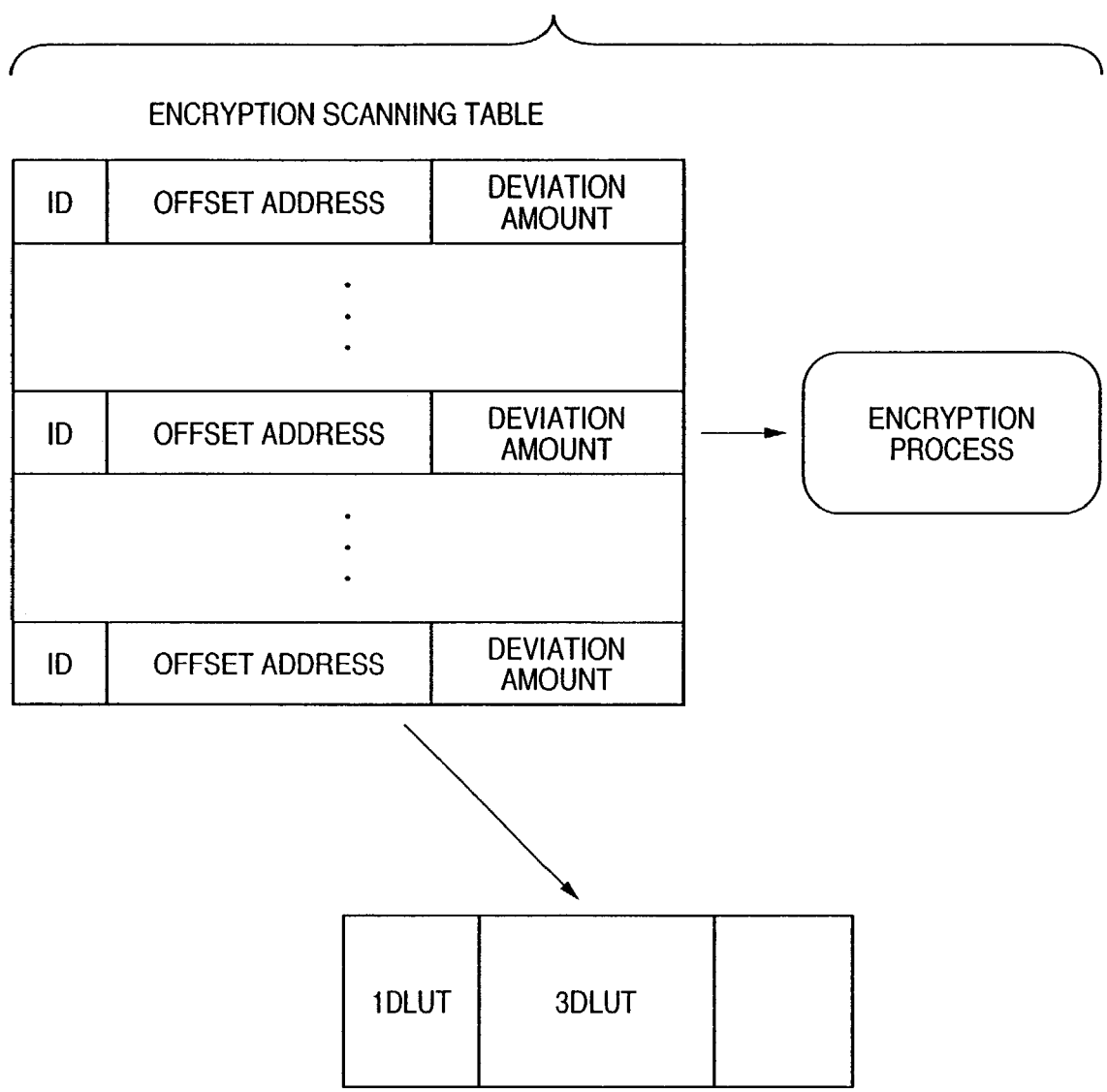

FIG. 11

PROFILE MANAGEMENT

RGB INPUT:      1101

| PROFILE (filename) | PROFILE INFORMATION | UPDATE DATE | FLAG |
|---|---|---|---|
| sRBG Monitor | DEFAULT | 2000/12/03 | |
| HDTV gamma 1.6 | | 1997/11/08 | |
| HDTV gamma 1.8 | | 1998/10/22 | |
| HDTV gamma 2.4 | | 1999/11/12 | |
| My_Monitor | LOCAL VERSION | 2000/12/07 | |
| My_Monitor_1 | TEST_1 | 2001/12/08 | |
| My_Monitor_2 | | 2001/12/08 | |

1102    1103    1104    1105

[ REGISTRATION ]   [ DELETE ]   [ SECURITY SETUP ]   [ BACK ]

PROFILE MANAGEMENT : EDIT

RGB INPUT:      1106

| PROFILE (filename) | PROFILE INFORMATION | | FLAG |
|---|---|---|---|
| My_Monitor_1 | TEST_1 | 2001/12/08 | |

1107 — [ EDIT PROFILE INFORMATION ]

[ ENCRYPTION ]   [ DECRYPTION ]   [ BACK ]
    1108        1109       1110

IMAGE PROCESSING APPARATUS, CONTROL METHOD THEREOF, AND IMAGE PROCESSING SYSTEM

FIELD OF THE INVENTION

The present invention relates to an image processing apparatus for encrypting a profile used in color matching, a control method thereof, a program, a storage medium, and an image processing system.

BACKGROUND OF THE INVENTION

In recent years, color printers which can implement color matching processes using profiles recommended by ICC (International Color Consortium) (ICC profiles) or the like have prevailed. In such printers, by executing a color matching process corresponding to an object to be drawn, preferable color reproduction can always be realized.

Note that the color matching technique realizes preferable color reproduction in a given device by mutually converting image data between device-independent color spaces and device-dependent color spaces using a profile, which stores color conversion characteristics corresponding to a device that forms a printing system as a file.

An ICC profile required to realize the aforementioned color matching process is often transferred to a remote place via a network such as the Internet or the like. However, since the data structure of the ICC profile is open to the public, internal data or the like may be tampered with when the profile is used via the network or the like, resulting in poor security. In order to provide illegibility to data itself, no optimal measure is available under existing circumstances.

SUMMARY OF THE INVENTION

According to one aspect of the present invention, there is provided an image processing apparatus which encrypts a profile for color matching using a predetermined algorithm.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of a GUI window used to make security setups of a profile in the first embodiment of the present invention;

FIG. 4 shows an example of the configuration of an encryption scanning table in the first embodiment of the present invention;

FIG. 11 shows an example of a GUI window used to make security setups of a profile in the fourth embodiment of the present invention;

DETAILED DESCRIPTION OF THE PREFERRED EMBODIMENTS

Preferred embodiments of the present invention will now be described in detail in accordance with the accompanying drawings.

Figure 1:
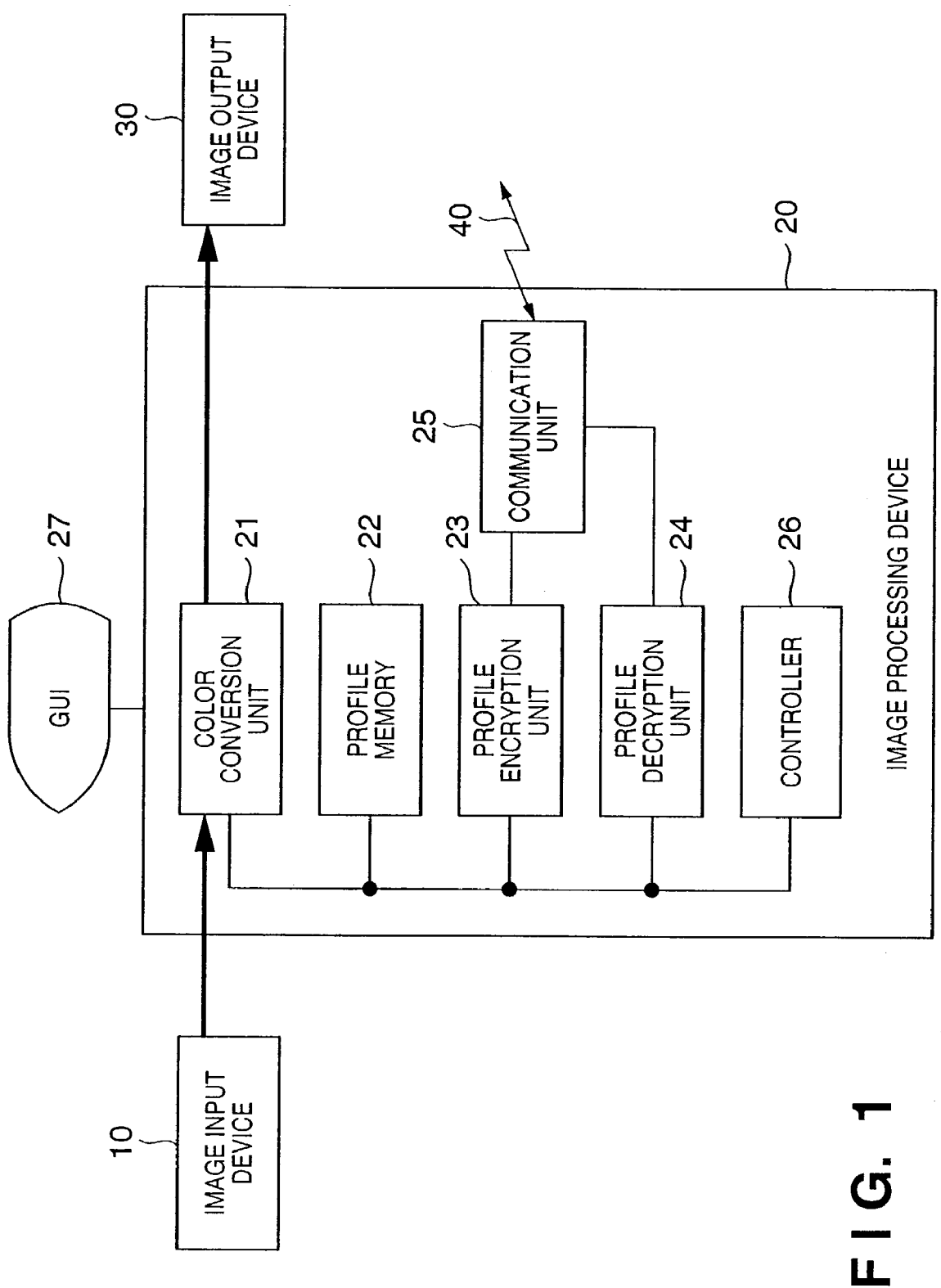
FIG. 1 is a schematic block diagram showing an example of the arrangement of a printing system according to an embodiment of the present invention.

FIG. 1 is a schematic block diagram preferably showing an example of the arrangement of a printing system according to a preferred embodiment of the present invention. This block diagram corresponds to the first to eighth embodiments to be described below. As shown in FIG. 1, the system of the present invention comprises an image input device 10, image processing device 20, and image output device 30. A color conversion unit 21 in the image processing device 20 executes color matching between the image input device 10 and image output device 30 with reference to an ICC profile in a profile memory 22.

The image processing device 20 has a profile encryption unit 23 and profile decryption unit 24, which respectively encrypt and decrypt a profile as a characteristic feature of the embodiment of the present invention. An ICC profile encrypted by the profile encryption unit 23 can be transmitted onto a network 40 via a communication unit 25. If an ICC profile received from the network 40 via the communication unit 25 has been encrypted, it is decrypted by the profile decryption unit 24, and is then referred to by the color conversion unit 21.

The units in the image processing device 20 are systematically controlled by a controller 26 which comprises a CPU, ROM, RAM, and the like. Reference numeral 27 denotes a GUI unit, which is used to make setups associated with data security (encryption and the like) in the embodiments of the present invention to be described below under the control of the controller 26.

<First Embodiment>

The first embodiment of the present invention will be described below.

Figure 2:
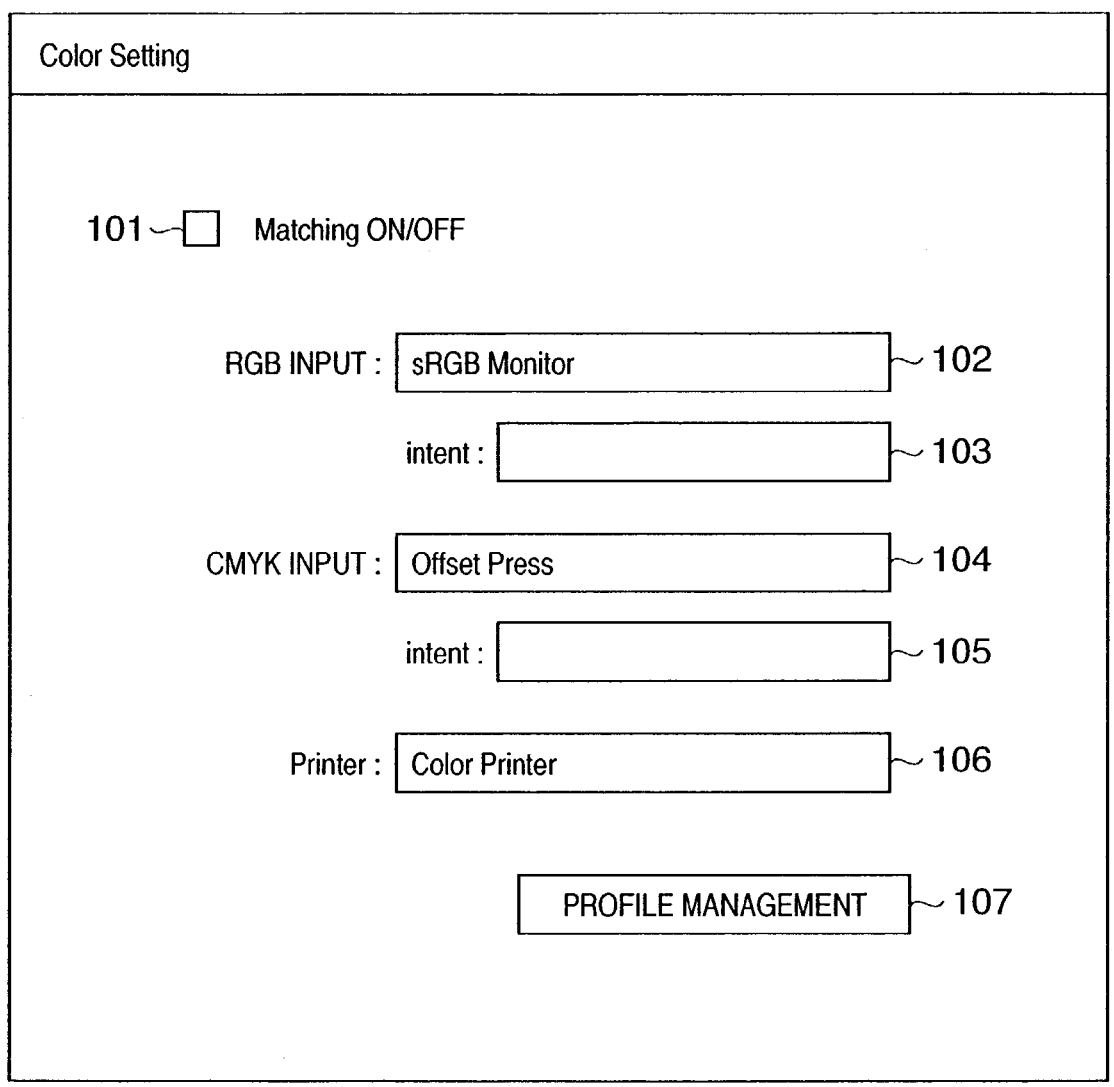
FIG. 2 shows an example of a GUI window used to make color matching setups in the first embodiment of the present invention.

FIG. 2 shows an example of a display window on the GUI unit 27 used to make color matching setups in the system of the present invention. With this GUI, a color matching process is ON/OFF-controlled. As shown in FIG. 2, as setup items of processing systems for input color spaces, two input systems, i.e., RGB and CMYK input systems, are available. For each color space, a profile can be designated, and an intent that indicates a matching method can be set. Also, since the profile of an output printer is associated with a printer connected, it can be set as needed in association with a print mode or the like.

On the GUI shown in FIG. 2, when the user moves a cursor onto a "profile management" button 107, a pull-down menu is displayed, and one of "RGB input", "CMYK input", and "printer setup" can be selected. When the user has selected one of these items, a "profile management" sheet shown in FIG. 3 is displayed.

In this embodiment, an ICC profile is selected as needed from the profile memory 22, and is registered. Available ICC profiles are displayed as a list 201 on the "profile management" sheet shown in FIG. 3. Upon adding a new profile, the user saves that ICC profile in the profile memory 22, and then presses a "registration" button 202 on the "profile management" sheet. When this new ICC profile is ready for use, its information is displayed on the list 201. When the user wants to delete a registered profile, he or she need only select an ICC profile displayed on the list 201, and then press a "delete" button 203.

In this embodiment, upon setting up the security of an ICC profile, the user selects a target ICC profile from the list 201 and then presses a "security setup" button 204 on the "profile management" sheet shown in FIG. 3. As a result, a "security setup" sheet shown in the lower portion of FIG. 3 is displayed, and encryption/decryption of the file itself can be manipulated. Note that details of profile encryption and decryption processes in this embodiment will be described later.

This embodiment is characterized in that an encryption scanning table is used upon encrypting/decrypting an ICC profile. This encryption scanning table is generated in the profile memory 22 in a profile encryption process.

FIG. 4 shows an example of the configuration of the encryption scanning table. As shown in FIG. 4, the encryption scanning table consists of a plurality of field data, and each field stores an ID indicating the data processing order, an offset address indicating the location of data to be processed, and a deviation amount indicating an amount to be subtracted from or added to the data to be processed. In this embodiment, by randomly generating the offset address and deviation amount within predetermined ranges, one encryption scanning table is generated.

Upon encrypting a profile in this embodiment, this encryption scanning table is encrypted (or decrypted) by a predetermined algorithm. In this case, practical data which form a 3D-LUT of the profile are changed, i.e., undergo a subtraction process of the set deviation amounts. Upon decrypting this 3D-LUT, data which form that 3D-LUT undergo an addition process of the deviation amounts with reference to the encryption scanning table, thus reproducing original data.

The encryption process of an ICC profile in this embodiment will be described below with reference to the flow chart shown in FIG. 5.

In step S111, a profile to be encrypted is loaded. In step S112, the profile is searched for an encryption file which indicates whether or not a subtraction process using the encryption scanning table (encryption subtraction process) has been done. Note that flag information in the profile is used as this encryption flag.

Based on this search result, it is checked in step S113 if the loaded profile can undergo the encryption subtraction process. In this embodiment, if the flag information indicates that the encryption subtraction process has been done, it is determined that encryption cannot be made. In this manner, the profile that has already undergone the encryption subtraction process can be prevented from undergoing another encryption subtraction process.

If it is determined that the profile can undergo the encryption subtraction process, the flow advances to step S114 to generate an encryption scanning table. In step S115, offset addresses and deviation amount data are read out in the order of stored ID numbers with reference to the respective field data of the generated encryption scanning table, and a 3D-LUT which forms the profile undergoes a subtraction process as needed.

In step S116, a general initialization process required for encryption is executed. In step S117, the encryption scanning table is encrypted. Note that the encryption scheme used in this step is not particularly limited, and every known encryption schemes can be applied.

After tag data of the profile is reconstructed in step S118, flag data indicating that the profile encryption subtraction process has been done is embedded in the tag data in step S119. In step S120, the ICC profile is reconstructed using the tag data.

It is examined in step S121 if the loaded ICC profile itself is overwritable. Only when it is determined that the file itself is overwritable, the profile is updated in step S122.

Figure 5:
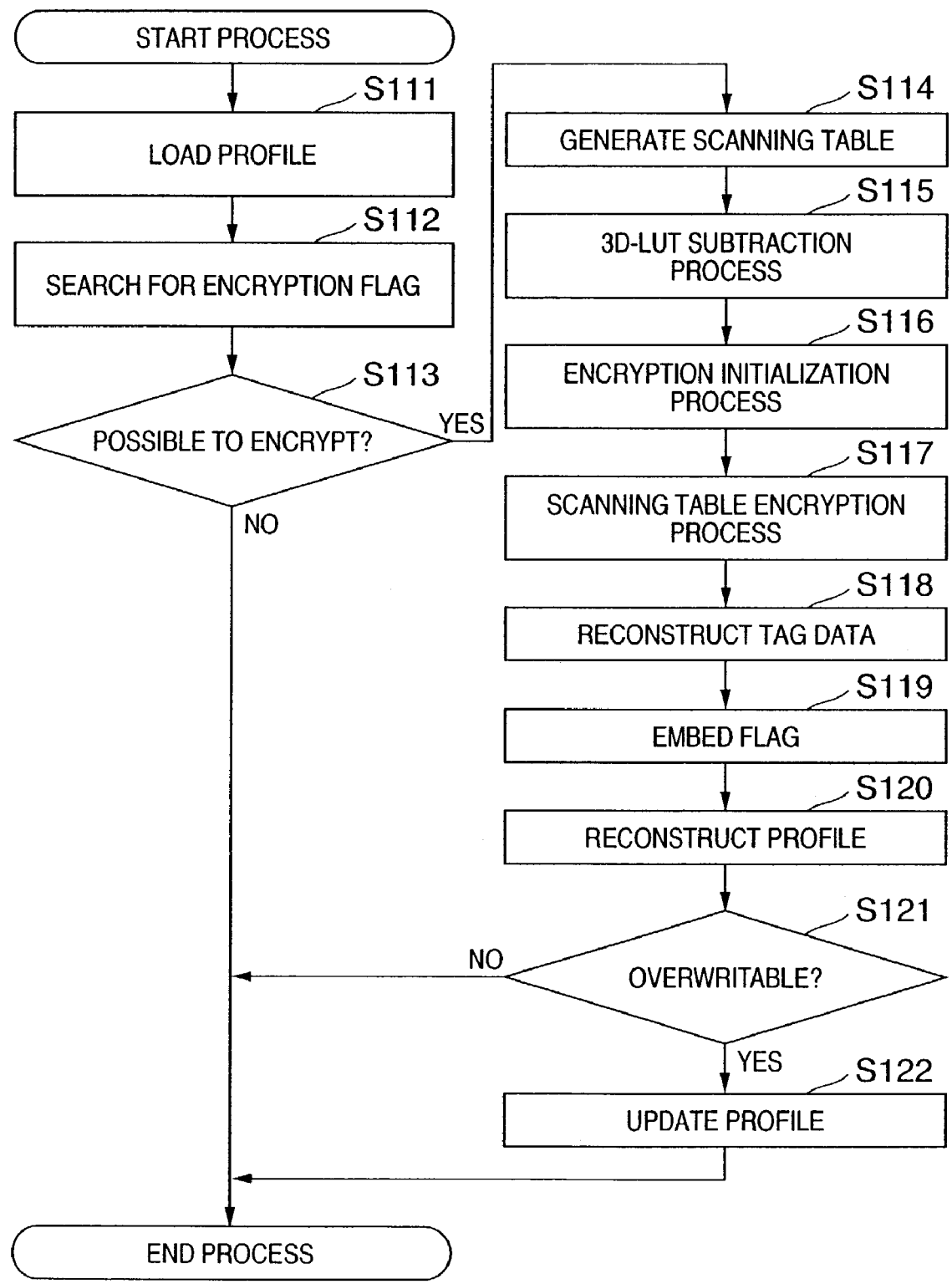
FIG. 5 is a flow chart showing an example of an encryption process in the first embodiment of the present invention.

In this way, in this embodiment, the encryption subtraction process of the profile, i.e., the subtraction process of the 3D-LUT and the encryption process of the scanning table are executed in accordance with the flow chart shown in FIG. 5.

In this embodiment, if it is determined at the beginning of the print process that the set ICC profile has been encrypted, a decryption process of that profile is executed in this system. The decryption process of this embodiment will be described below with reference to the flow chart in FIG. 6.

In step S211, the ICC profile set for the print process is loaded. In step S212, the profile is searched for its encryption flag. It is then determined in step S213 based on that encryption flag whether or not the profile must undergo a decryption process. That is, if the encryption flag indicates that the profile has already been encrypted, it is determined that a decryption process of the encryption scanning table and an addition process of the 3D-LUT (decryption addition process) must be done.

If it is determined that the decryption process must be done, the encryption scanning table is extracted in step S214, and a general initialization process required for the decryption addition process is executed in step S215. After that, a decryption process of the encryption scanning table is executed in step S216.

In step S217, the 3D-LUT of the profile undergoes an addition process as needed by extracting offset addresses and deviation amount data in the order of stored ID numbers with reference to respective field data of the decrypted scanning table.

Tag data of the profile is reconstructed in step S218, and the profile is reconstructed using the tag data in step S219. The decrypted ICC profile is set in this system in step S220.

Note that the ICC profile decrypted in this embodiment is mapped only on an internal resource (work memory or the like) on which this system is running, so as not to be referred to externally.

As described above, according to this embodiment, only an LUT tag part of the ICC profile is encrypted. In this way, illegibility can be given to the ICC profile so as to prevent its internal data from being tampered with. Hence, the ICC profile can be used with high security even via the network.

The internal data itself in the encrypted ICC profile has values close to original values before encryption, and respective data values have undergone the subtraction process. Hence, even when this profile is used in a system which has no profile decryption function, a print process with minimum image quality can be guaranteed without exceeding the restriction of the total ink amount in a printer engine of that system.

As described above, according to the present invention in this embodiment, the encryption scanning table of an ICC profile is generated and is encrypted, thus allowing appropriate encryption of the ICC profile.

<Second Embodiment>

In general, a profile includes a plurality of conversion data as tags. For example, a profile has LUT data (called A2B tag) used to convert data from a given device-dependent color space into a device-independent color space, and LUT data (called B2A tag) used to convert data from a device-independent color space into a device-dependent color space. These tag data are classified (e.g., to B2A0, B2A1, B2A2, and the like) in accordance with the types of LUT data used in color conversion.

Figure 7:
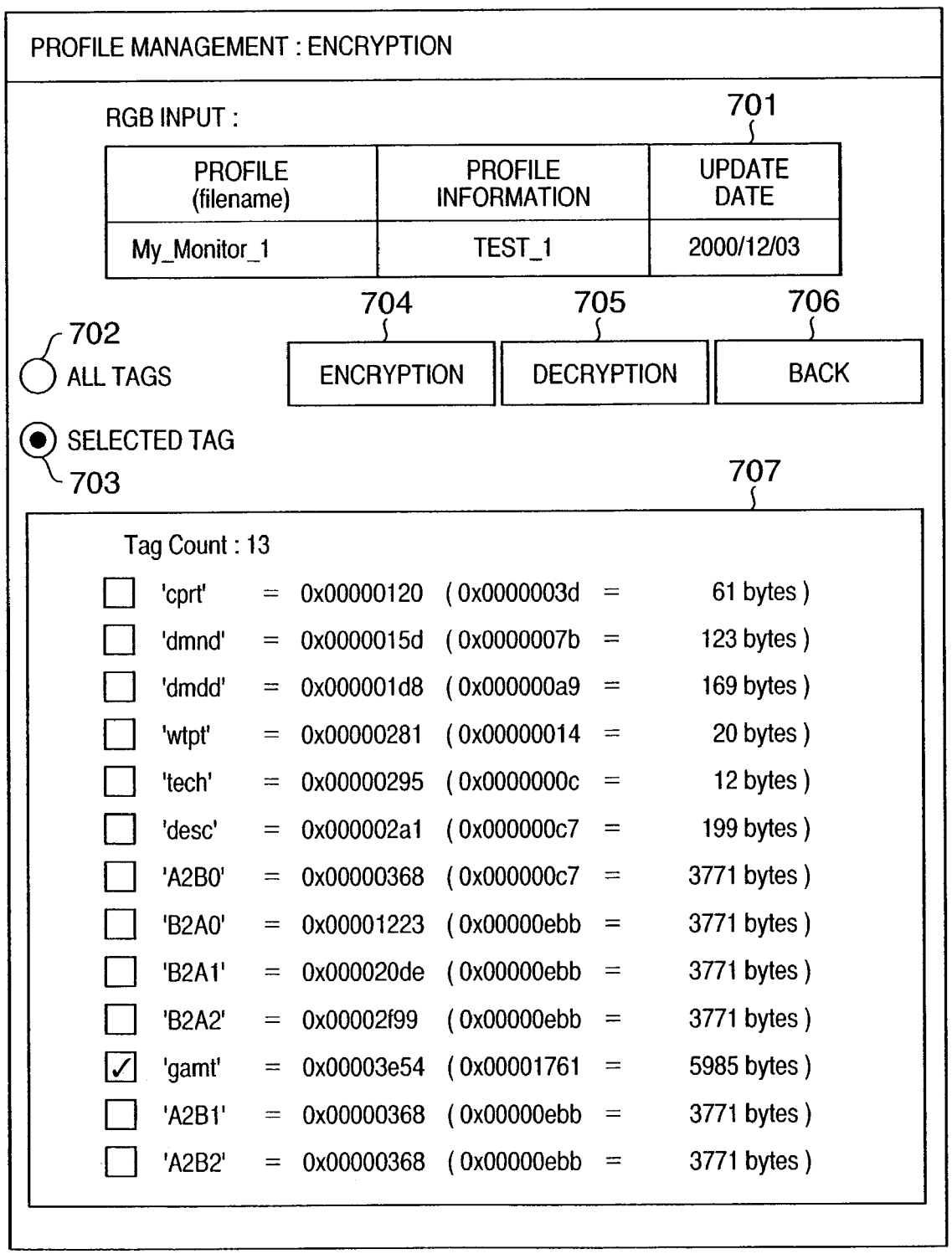
FIG. 7 shows an example of a GUI window used to make security setups of a profile in the second embodiment of the present invention.

Hence, this embodiment is characterized in that data to be encrypted in a profile can be set for each tag in addition to the first embodiment. More specifically, on a "security setup" sheet shown in FIG. 7, all pieces of tag information of a currently selected profile 701 are displayed as a list 707 on the screen. When the user selects a tag to be encrypted from this list 707 and then presses an encryption button 704, data of the selected tag part can be encrypted. FIG. 7 shows a state wherein a "gamt" (Gamut) tag has been selected. An example of an encryption process of gamut tag data in a profile will be described below.

Figure 8:
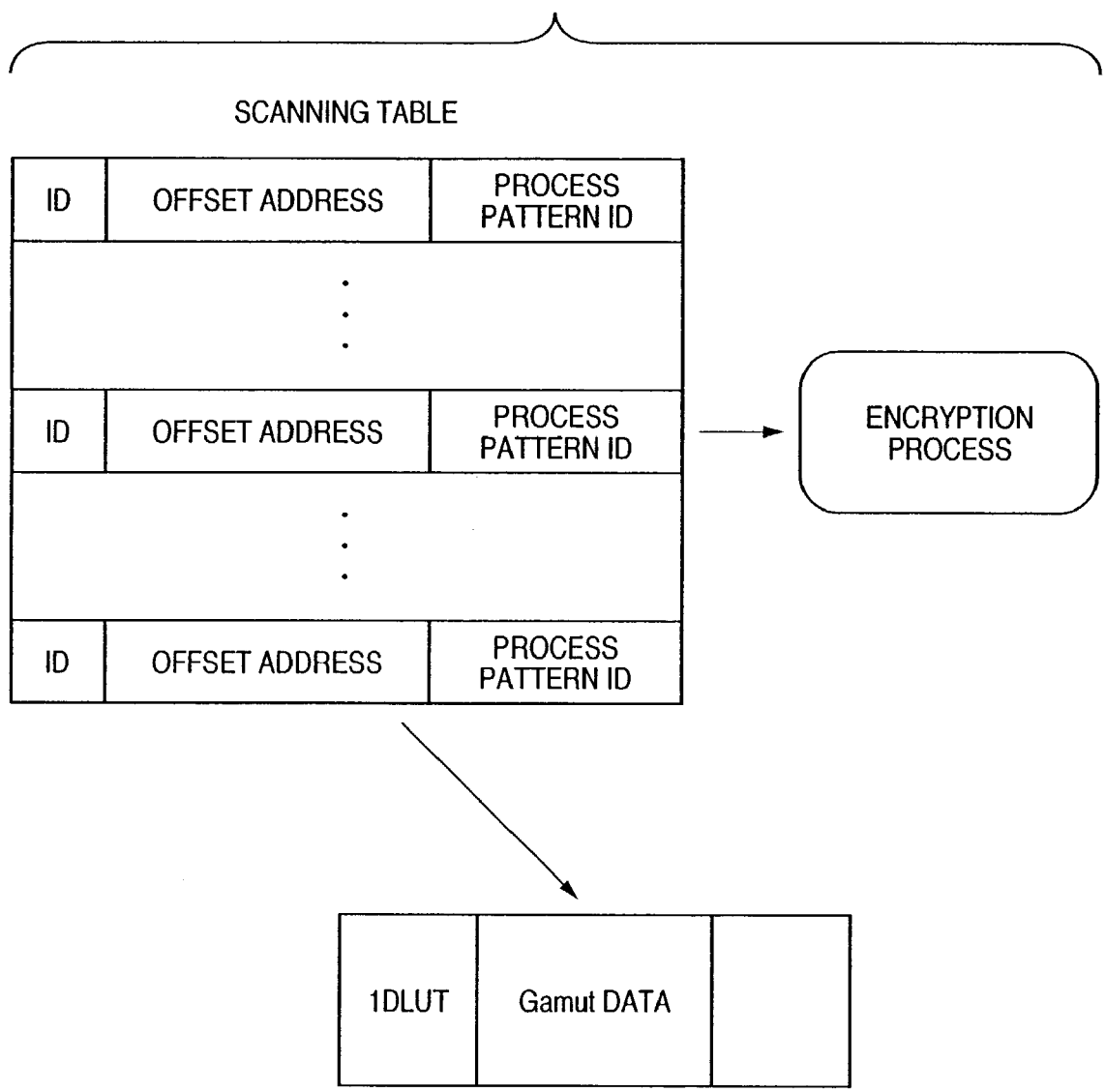
FIG. 8 shows an example of the configuration of an encryption scanning table in the second embodiment of the present invention.

In this embodiment, an encryption scanning table is used upon encrypting/decrypting an ICC profile. FIG. 8 shows an example of the configuration of the encryption scanning table. As shown in FIG. 8, the encryption scanning table consists of a plurality of field data, and each field stores an ID indicating the data processing order, an offset address indicating the location of data to be processed, and a process pattern ID indicating bit manipulation information for data to be encrypted.

As process pattern IDs, the following rules may be prepared. That is, if the process pattern ID is "1", only the upper 4 bits are XORed; if it is "2", the 3rd and 6th bits are replaced; and so forth. Since these rules are similarly referred to upon decrypting bits, the contents of bit manipulations should be designed to allow to restore original data in accordance with the process pattern IDs alone.

In this embodiment, by randomly generating the offset addresses and process pattern IDs within predetermined ranges, one encryption scanning table is generated.

Upon encrypting a profile in this embodiment, this encryption scanning table is encrypted (or decrypted) by a predetermined algorithm. In this case, practical data (gamut tag data in this embodiment) in a profile is changed, i.e., undergoes bit manipulations on the basis of the set process pattern IDs. Upon decoding this gamut tag data, manipulations opposite to the above bit manipulations are executed with reference to the encryption scanning table, thus reconstructing original data.

The encryption process of an ICC profile in this embodiment will be described below. The encryption process in this embodiment is substantially the same as that in the first embodiment.

However, in this embodiment, practical data in a profile is gamut tag data unlike in the first embodiment that uses the 3D-LUT.

Therefore, the step of the process executed for the 3D-LUT in the first embodiment is replaced by that executed for gamut tag data in this embodiment.

More specifically, in step S115 the offset addresses and process pattern IDs are read out in the order of stored ID numbers with reference to respective field data of the generated encryption scanning table, and gamut tag data which forms the profile undergoes bit operation processes corresponding to the process pattern IDs.

Also, the decryption process in this embodiment is substantially the same as that in the first embodiment. However, since practical data in the profile is gamut tag data in this embodiment, the step of the process executed for the 3D-LUT in the first embodiment is replaced by that executed for gamut tag data in this embodiment.

Figure 6:
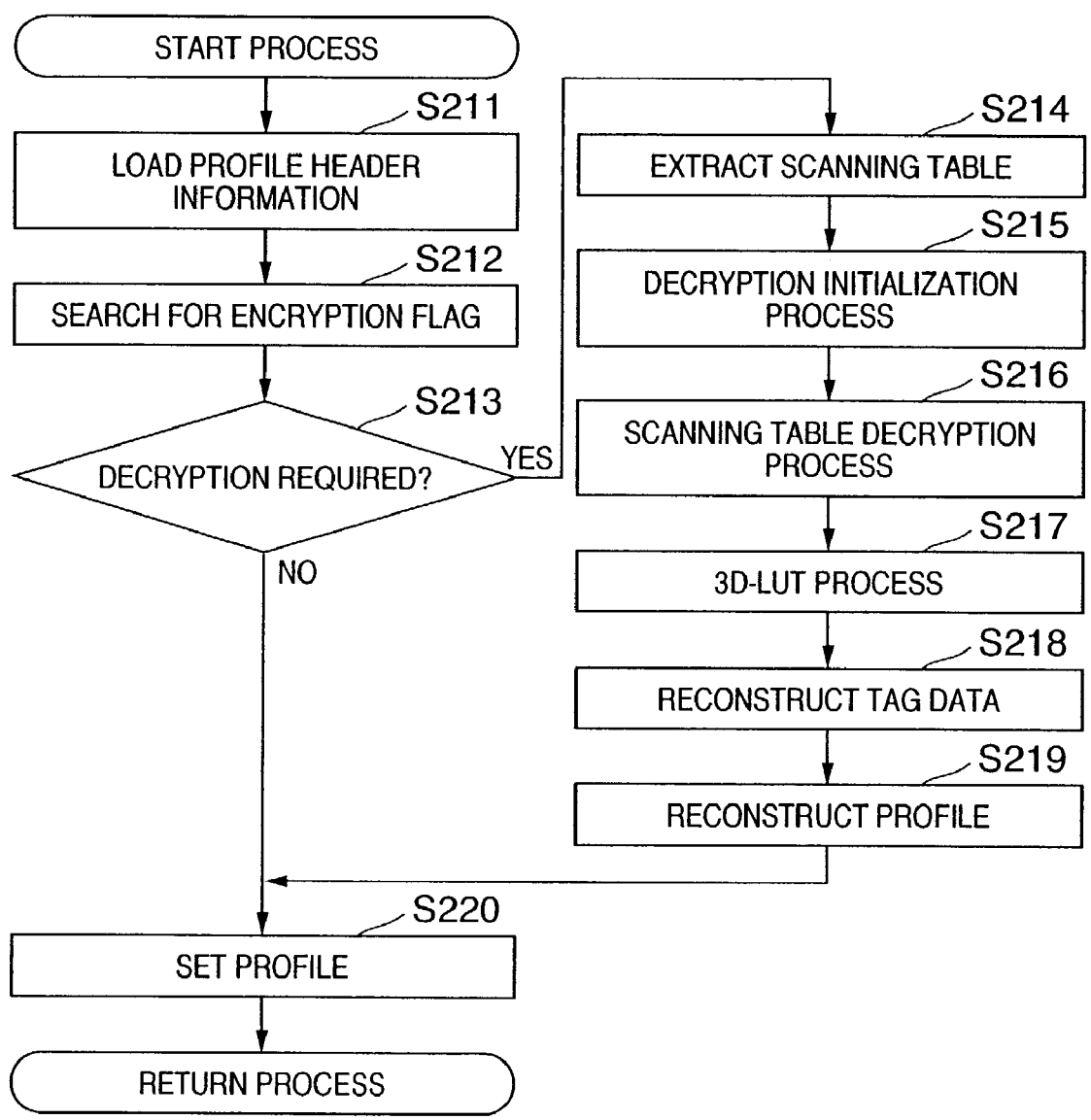
FIG. 6 is a flow chart showing an example of a decryption process in the first embodiment of the present invention.

That is, in the flow chart of the decryption process shown in FIG. 6, in step S217 the offset addresses and process pattern IDs are read out in the order of stored ID numbers with reference to respective field data of the decrypted encryption scanning table, and gamut tag data of the profile undergoes manipulations opposite to bit manipulations indicated by the process pattern IDs.

As described above, according to this embodiment, an LUT tag part of the ICC profile is encrypted. In this way, illegibility can be given to the ICC profile so as to prevent its internal data from being tampered with. Hence, the ICC profile can be used with high security even via the network.

Since arbitrary data of the internal data of the ICC profile can be selectively encrypted, the encryption system can be optimized.

In the example of this embodiment, gamut tag data in a profile undergoes bit manipulations. Of course, even when a plurality of arbitrary tag data are selected, the present invention can be applied.

As described above, according to the present invention in this embodiment, since an arbitrary tag part in an ICC profile is encrypted, the ICC profile can be appropriately encrypted.

<Third Embodiment>

In this embodiment, an ICC profile is encrypted for each block, and the already encrypted ICC profile is controlled not to be encrypted again.

The GUI window used to make color matching setups in the third embodiment is the same as that of the first embodiment shown in FIGS. 2 and 3.

The encryption process of the ICC profile in this embodiment will be described below with reference to the flow chart shown in FIG. 9.

In step S901, a profile to be encrypted is loaded. It is then checked in step S902 if the profile can undergo an encryption process. With this checking process, the already encrypted profile can be avoided from being encrypted again. As a practical checking method, data are read out in turn from the first byte of a part to be examined and their regularities are checked, and if these data have a given regularity, it is determined that the profile is not encrypted; otherwise, it is determined that the profile has been encrypted.

If the profile can undergo an encryption process, the flow advances to step S903 to execute a general initialization process required for encryption. After that, blocks to be encrypted are extracted in step S904. In step S905, the extracted blocks are encrypted as needed to generate an encrypted block group. Note that the encryption scheme used in this step is not particularly limited, and every known encryption schemes can be applied. In step S906, a profile is reconstructed using the encrypted block group generated in step S905.

In order to save the encrypted ICC profile, which is reconstructed in this way, it is checked in step S907 if the loaded ICC profile itself is overwritable. Only when it is determined that the file itself is overwritable, the profile is updated in step S908.

Figure 9:
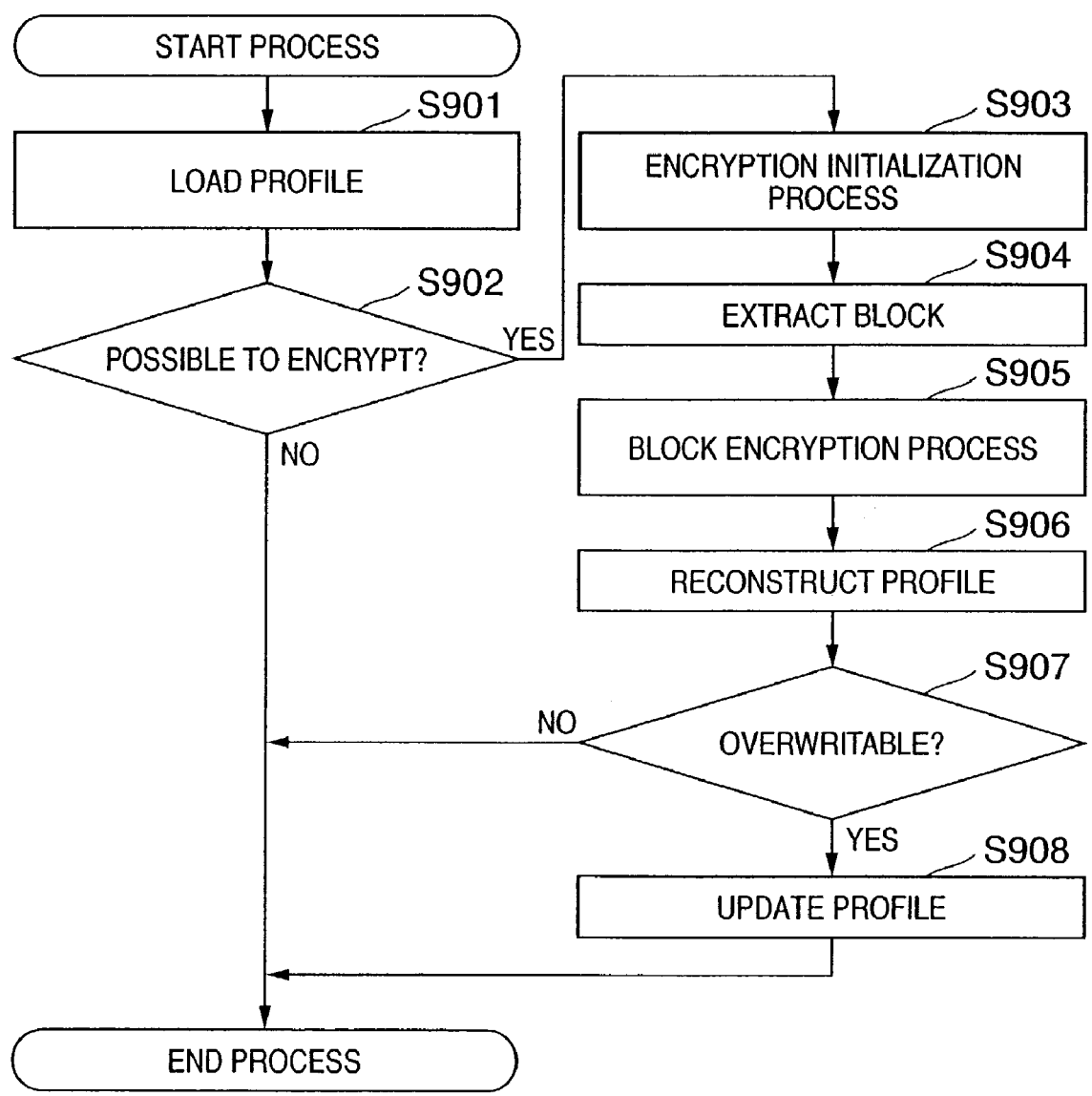
FIG. 9 is a flow chart showing an example of an encryption process in the third embodiment of the present invention.

As described above, in this embodiment, the encryption process of the profile is executed for respective blocks in accordance with the flow chart shown in FIG. 9.

Figure 10:
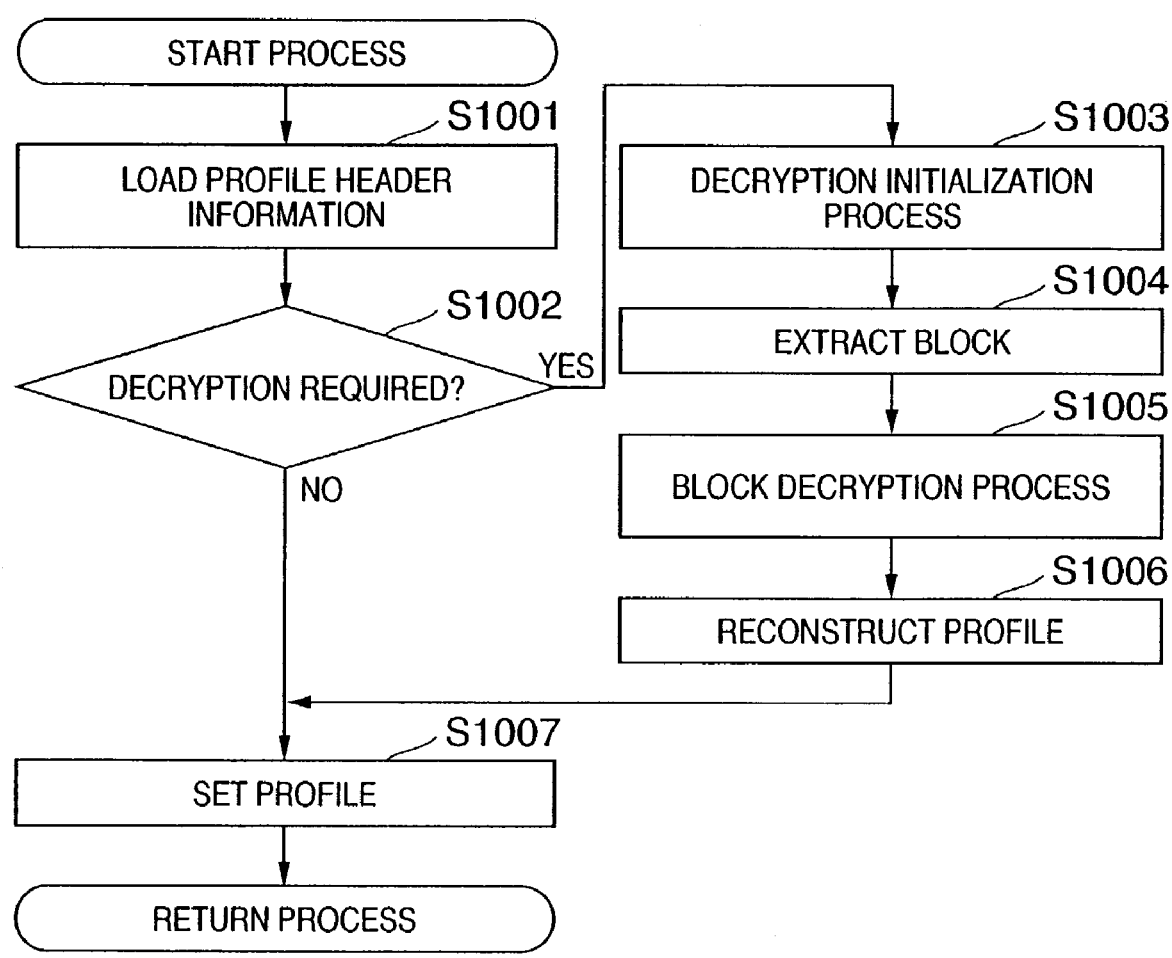
FIG. 10 is a flow chart showing an example of a decryption process in the third embodiment of the present invention.

In this embodiment, if it is determined at the beginning of the print process that the set ICC profile has been encrypted, a decryption process of that profile is executed in this system. The decryption process of this embodiment will be described below with reference to the flow chart in FIG. 10.

In step S1001, the ICC profile set for the print process is loaded. It is checked in step S1002 if the profile must undergo a decryption process. More specifically, data are read out in turn from the first byte of a part to be examined of the profile. If these data have a given regularity, since the profile is not encrypted, it is determined that the profile need not be decrypted; otherwise, since the profile has been encrypted, it is determined that the profile must be decrypted.

If it is determined that the profile must be decrypted, a general initialization process required for decryption is executed in step S1003. After that, blocks are extracted in step S1004 and are decrypted in step S1005.

After the profile is reconstructed using the decrypted blocks in step S1006, the decrypted ICC profile is set in this system in step S1007.

Note that the ICC profile decrypted in this embodiment is mapped only on an internal resource (work memory or the like) on which this system is running, so as not to be referred to externally.

As described above, according to the present invention of this embodiment, the ICC profile can be encrypted for respective blocks. Also, the already encrypted ICC profile can be controlled not to be encrypted again.

<Fourth Embodiment>

In this embodiment, in order to allow more efficient encryption according to the present invention, an encryption flag is set in the header field of an ICC profile, and whether or not the profile has already been encrypted can be confirmed easily. The fourth embodiment of the present invention will be described below.

A GUI window used to make color matching setups in the fourth embodiment is the same as that of the first embodiment shown in FIG. 2. As setup items of processing systems for input color spaces, two input systems, i.e., RGB and CMYK input systems, are available. For each color space, a profile can be designated, and an intent that indicates a matching method can be set. Also, since the profile of an output printer is associated with a printer connected, it is set as needed in association with a print mode or the like.

On the GUI shown in FIG. 2, when the user moves a cursor onto the "profile management" button 107, a pull-down menu is displayed, and one of "RGB input", "CMYK input", and "printer setup" can be selected. When the user has selected one of these items, a "profile management" sheet shown in FIG. 11 is displayed in the fourth embodiment.

In the fourth embodiment as well, an ICC profile is selected as needed from the profile memory 22, and is registered. Available ICC profiles are displayed as a list 1101 on the "profile management" sheet shown in FIG. 11. On the list 1101, an item "flag" which indicates the security setup state is displayed in addition to the profile information and update date for each of registered ICC profiles. The fourth embodiment is characterized in that a mark indicating that the profile has already been encrypted is displayed in this item "flag" in correspondence with the already encrypted profile.

In the fourth embodiment, upon adding a new profile, the user saves that ICC profile in the profile memory 22, and then presses a "registration" button 1102 on the "profile management" sheet. When this new ICC profile is ready to be used, its information is displayed on the list 1101. When the user wants to delete a registered profile, he or she need only select an ICC profile displayed on the list 1101, and then press a "delete" button 1103.

Upon setting up the security of an ICC profile, the user selects a target ICC profile from the list 1101 and then presses a "security setup" button 1104 on the "profile management" sheet shown in FIG. 11. As a result, a "security setup" sheet shown in the lower portion of FIG. 11 is displayed.

Profile information 1106 displayed on this "security setup" sheet has an item "flag" as in the list 1101. With this item, the user can easily determine whether or not the profile of interest has already been encrypted. Therefore, the user can surely issue an encryption or decryption instruction of that profile.

Note that an "edit profile information" button 1107 is used when the user instructs to edit the contents of the information field of a profile. This button is used when the user wants to append comment text upon executing a process such as encryption or the like.

Figure 12:
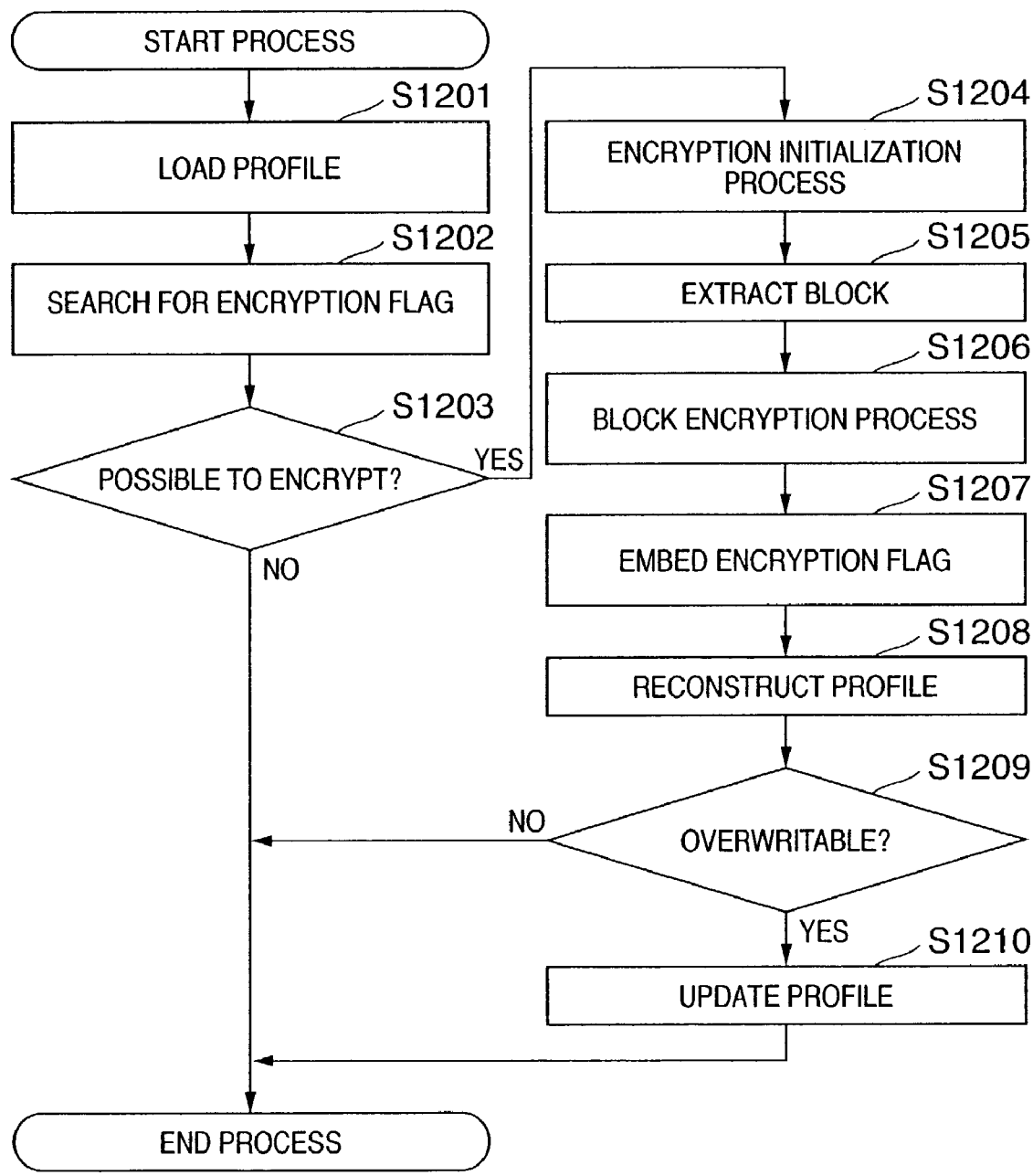
FIG. 12 is a flow chart showing an example of an encryption process in the fourth embodiment of the present invention.

The encryption process of an ICC profile in the fourth embodiment will be described below with reference to the flow chart shown in FIG. 12.

In step S1201, a profile to be encrypted is loaded. In step S1202, the profile is searched for an encryption file which indicates whether or not encryption has been done. Note that flag information in the profile is used as this encryption flag.

Based on this search result, it is checked in step S1203 if the loaded profile can undergo the encryption process. In this embodiment, if the flag information indicates that the encryption process has been done, it is determined that encryption cannot be made. In this manner, the profile that has already been encrypted can be prevented from being encrypted again.

If it is determined that the profile can undergo the encryption process, the flow advances to step S1204 to execute a general initialization process required for encryption. After that, blocks to be encrypted are extracted in step S1205. In step S1206, the extracted blocks are encrypted as needed to generate an encrypted block group. Note that the encryption scheme used in this step is not particularly limited, and every known encryption schemes can be applied.

In step S1207, flag data indicating that encryption has been done is embedded in the header information field of the profile. In step S1208, the profile is reconstructed using the encrypted block group generated in step S1206.

In order to save the encrypted ICC profile, which is reconstructed in this way, it is checked in step S1209 if the loaded ICC profile itself is overwritable. Only when it is determined that the file itself is overwritable, the profile is updated in step S1210.

As described above, according to the fourth embodiment, since the encryption flag is set in the header field of the ICC profile, whether or not that profile has already been encrypted can be easily confirmed, thus allowing more efficient encryption.

When the ICC profile encrypted in the fourth embodiment to be used in color matching, whether or not that profile is to be decrypted can be easily determined by checking the encryption flag in its header field.

<Fifth Embodiment>

In this embodiment, in order to achieve encryption more suited to delivery onto the network according to the present invention, an ICC profile is compressed, and is then encrypted for respective blocks. The fifth embodiment of the present invention will be described below.

Since the arrangement and GUI of the printing system in the fifth embodiment are the same as those described above, a description thereof will be omitted.

The fifth embodiment is characterized in that the ICC profile undergoes a compression process prior to an encryption process for respective blocks as in the third embodiment.

The encryption process of an ICC profile in the fifth embodiment will be described below with reference to the flow chart shown in FIG. 13.

In step S1301, a profile to be encrypted is loaded. Tag data to be encrypted is extracted in step S1302, and it is checked in step S1303 if that data can be encrypted. As a practical checking method, data are read out in turn from the first byte of a part to be examined, and if these data have a given regularity, it is determined that the profile is not encrypted; otherwise, it is determined that the profile has been encrypted.

If the profile cannot be encrypted, the process ends immediately; otherwise, the flow advances to step S1304 to check if that data can be compressed. It is determined that the data can be compressed when the data to be compressed has redundancy, and high compression efficiency is expected. Therefore, if poor compression efficiency is expected, it is determined that the data cannot be compressed. If the data cannot be compressed, the flow advances to step S1307; otherwise, the flow advances to step S1305 to execute a compression process. After the file size is adjusted in correspondence with a change in data size as a result of compression in step S1306, the flow advances to step S1307.

In step S1307, a general initialization process required for encryption is executed. In step S1308, blocks to be encrypted are extracted. In step S1308, the extracted blocks are encrypted as needed to generate an encrypted block group. Note that the encryption scheme used in this step is not particularly limited, and every known encryption schemes can be applied. In step S1310, a profile is reconstructed using the encrypted block group generated in step S1309.

In order to save the encrypted ICC profile, which is reconstructed in this way, it is checked in step S1311 if the loaded ICC profile itself is overwritable. Only when it is determined that the file itself is overwritable, the profile is updated in step S1312.

Figure 13:
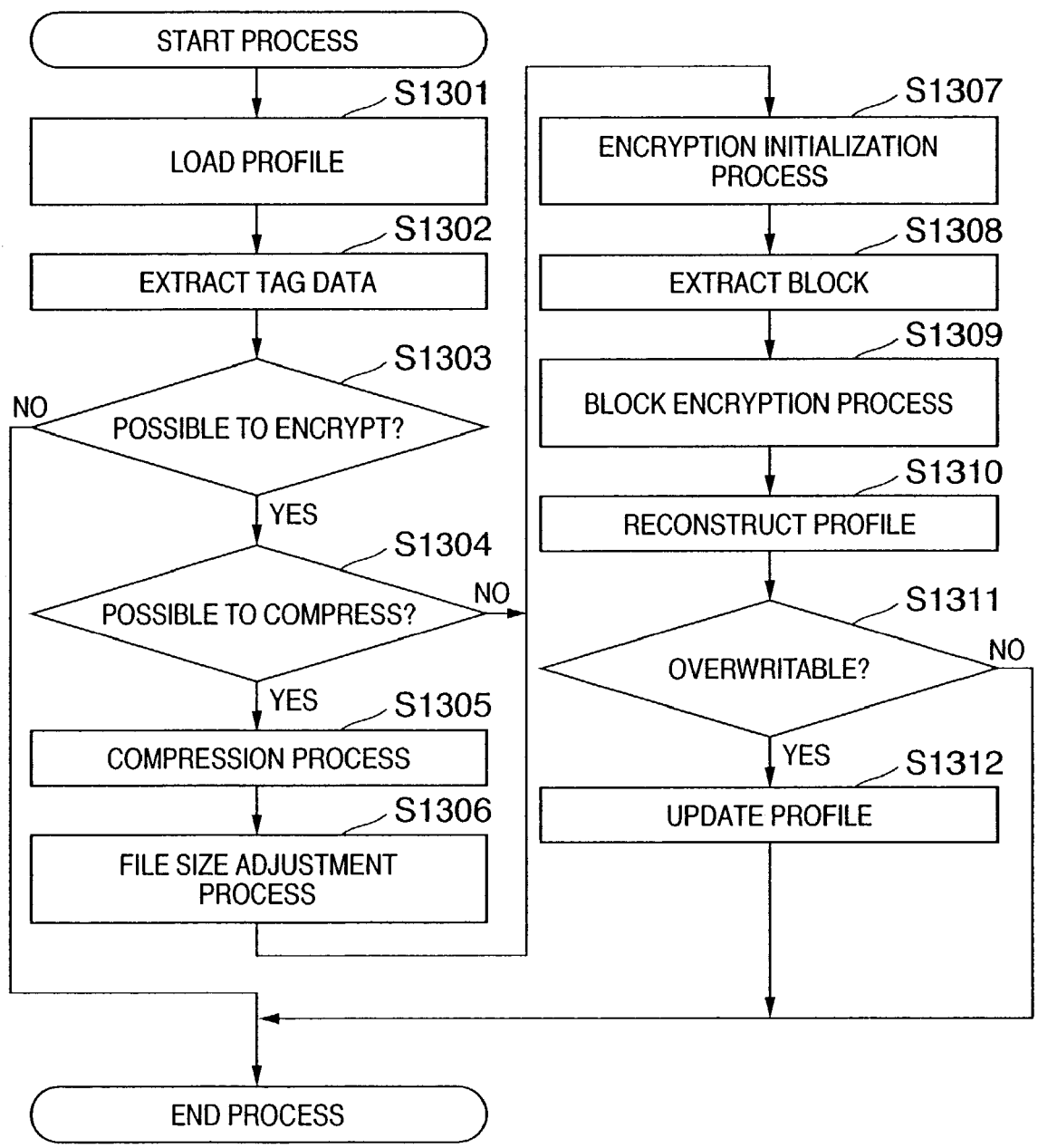
FIG. 13 is a flow chart showing an example of an encryption process in the fifth embodiment of the present invention.

As described above, according to the fifth embodiment, the compression process of a profile and the encryption process for respective blocks are executed in accordance with the flow chart shown in FIG. 13.

Figure 14:
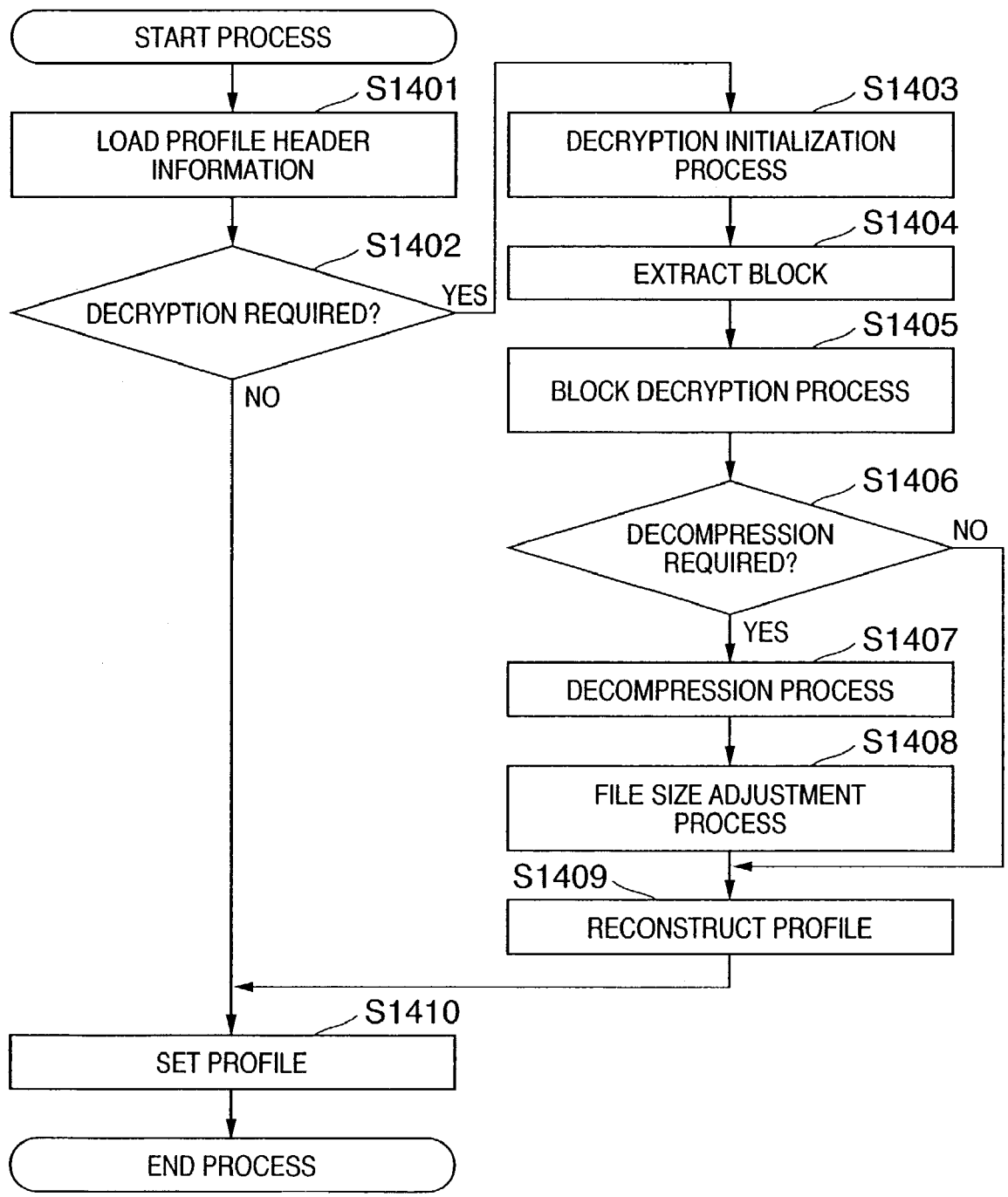
FIG. 14 is a flow chart showing an example of a decryption process in the fifth embodiment of the present invention.

The decryption process in the fifth embodiment will be described below with reference to the flow chart in FIG. 14.

In step S1401, the ICC profile set for the print process is loaded. It is checked in step S1402 if the profile must undergo a decryption process. More specifically, data are read out in turn from the first byte of a part to be examined of the profile. If these data have a given regularity, since the profile is not encrypted, it is determined that the profile need not be decrypted; otherwise, since the profile has been encrypted, it is determined that the profile must be decrypted.

If it is determined that the profile must be decrypted, a general initialization process required for decryption is executed in step S1403. After that, blocks are extracted in step S1404 and are decrypted in step S1405.

It is checked in step S1406 if the decrypted profile is compressed data, i.e., if that profile must undergo a decompression process. If no decompression process is required as a result of checking, the flow jumps to step S1409; otherwise, the flow advances to step S1407 to execute a decompression process. Then, the file size is adjusted in step S1408.

In step S1409, a profile is reconstructed using the non-compressed (decompressed) blocks. In step S1410, the decrypted ICC profile is set in this system.

Note that the ICC profile decrypted in the fifth embodiment is mapped only on an internal resource (work memory or the like) on which this system is running, so as not to be referred to externally.

As described above, according to the fifth embodiment, since the ICC profile can be compressed and then encrypted for respective blocks, the final file size can be reduced, and encryption more suited to delivery onto the network can be implemented.

<Sixth Embodiment>

In this embodiment, in order to allow more efficient encryption according to the present invention, an encryption flag is set in the header field of an ICC profile upon compressing and encrypting the ICC profile. The sixth embodiment of the present invention will be described below.

Since the arrangement and GUI of the printing system in the fifth embodiment are the same as those in the fourth embodiment described above, a description thereof will be omitted.

The sixth embodiment is characterized in that an ICC profile is compressed prior to encryption with reference to an encryption flag as in the fourth embodiment. That is, as shown in FIG. 11, a mark indicating that the profile has already been encrypted is displayed in an item "flag" in correspondence with the already encrypted profile. With this item "flag", the user can easily determine whether or not the profile of interest has already been encrypted, and can surely issue an encryption or decryption instruction of that profile.

Figure 15:
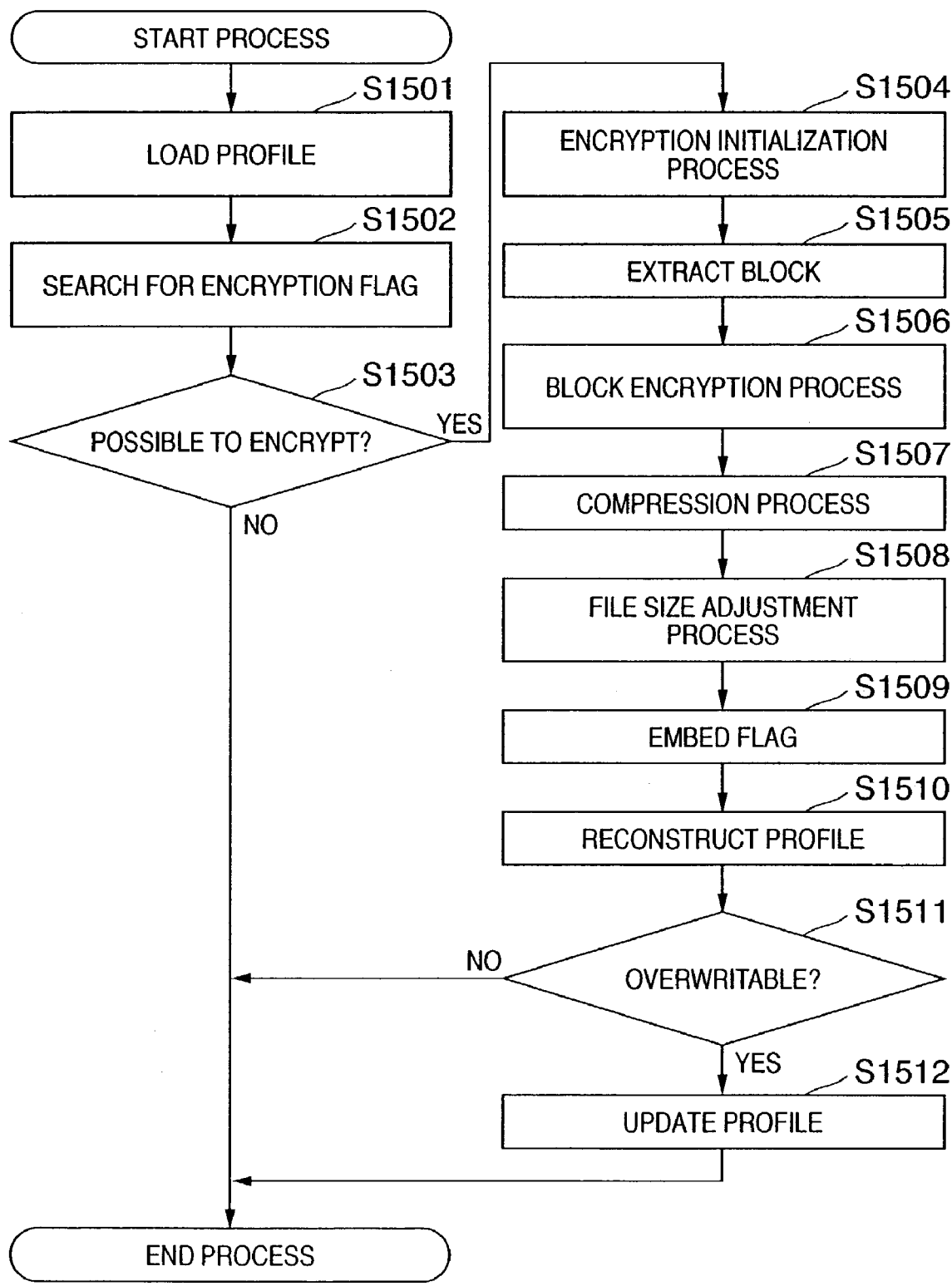
FIG. 15 is a flow chart showing an example of an encryption process in the sixth embodiment of the present invention.

The encryption process of an ICC profile in the sixth embodiment will be described below with reference to the flow chart shown in FIG. 15.

In step S1501, a profile to be encrypted is loaded. In step S1502, the profile is searched for an encryption file which indicates whether or not encryption has been done. Note that flag information in the profile is used as this encryption flag.

Based on this search result, it is checked in step S1503 if the loaded profile can undergo the encryption process. In this embodiment, if the flag information indicates that the encryption process has been done, it is determined that encryption cannot be made. In this manner, the profile that has already been encrypted can be prevented from being encrypted again.

If it is determined that the profile can undergo the encryption process, the flow advances to step S1504 to execute a general initialization process required for encryption. After that, blocks to be encrypted are extracted in step S1505. In step S1506, the extracted blocks are encrypted as needed to generate an encrypted block group. Note that the encryption scheme used in this step is not particularly limited, and every known encryption schemes can be applied.

In step S1507, the encrypted block group is compressed. In step S1508, the file size is adjusted in correspondence with a change in data size as a result of the compression process.

In step S1509, flag data indicating that encryption and compression have been done is embedded in the header information field of the profile. In step S1510, the profile is reconstructed using the encrypted block group compressed in step S1507.

In order to save the encrypted ICC profile, which is reconstructed in this way, it is checked in step S1511 if the loaded ICC profile itself is overwritable. Only when it is determined that the file itself is overwritable, the profile is updated in step S1512.

As described above, according to the sixth embodiment, since the encryption flag is set in the header field of an ICC profile upon compressing and encrypting the ICC profile, whether or not that profile has already been encrypted can be easily confirmed, thus allowing more efficient encryption.

When the ICC profile encrypted in the sixth embodiment to be used in color matching, whether or not that profile is to be decrypted can be easily determined by checking the encryption flag in its header field, and the profile can be decrypted as needed.

<Seventh Embodiment>

In this embodiment, a parameter that limits the total ink amount in a print process is appended to an ICC profile according to the present invention, and the ICC profile is then encrypted. The seventh embodiment of the present invention will be described below.

Since the arrangement and GUI of the printing system in the seventh embodiment are the same as those in the first embodiment described above, a description thereof will be omitted.

The encryption process of an ICC profile in this embodiment will be described below with reference to the flow chart shown in FIG. 16.

In step S1601, a profile to be encrypted is loaded. In step S1602, the profile is searched for an encryption file which indicates whether or not encryption has been done. Note that flag information in the profile is used as this encryption flag.

Based on this search result, it is checked in step S1603 if the loaded profile can undergo the encryption process. In this embodiment, if the flag information indicates that the encryption process has been done, it is determined that encryption cannot be made. In this manner, the profile that has already been encrypted can be prevented from being encrypted again.

If it is determined that the profile can undergo the encryption process, the flow advances to step S1604 to execute a general initialization process required for encryption. After that, blocks to be encrypted (3D-LUT) are extracted in step S1605. In step S1606, the extracted blocks are encrypted as needed to generate an encrypted block group. Note that the encryption scheme used in this step is not particularly limited, and every known encryption schemes can be applied.

In step S1607, an output value limit parameter is generated so as to reduce the load on a printer engine even when the encrypted data is used without being decrypted. In this embodiment, since the total ink amount in the print process is not limited due to encryption, 50% output limitation is uniformly applied to C, M, Y, and K values. Such output limitation can be implemented by adjusting linear LUT data in tag data.

In step S1608, encrypted tag data is generated by combining the encrypted block data group and the limitation parameter. In step S1609, flag data indicating that encryption with the limitation parameter has been done is embedded in a header information field of the profile. In step S1610, the profile is reconstructed using the encrypted tag data generated in step S1608.

In order to save the encrypted ICC profile, which is reconstructed in this way, it is checked in step S1611 if the loaded ICC profile itself is overwritable. Only when it is determined that the file itself is overwritable, the profile is updated in step S1612.

Figure 16:
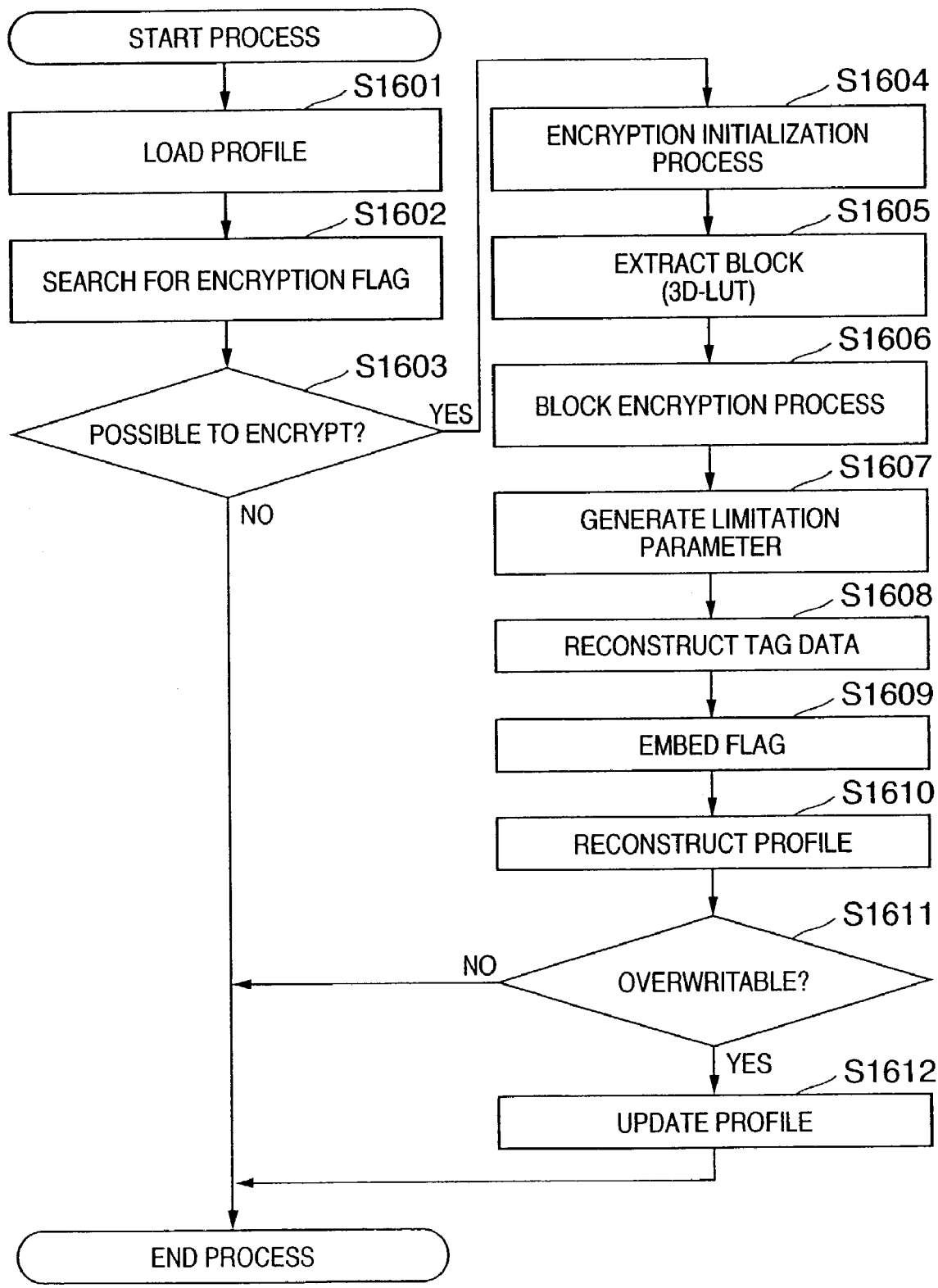
FIG. 16 is a flow chart showing an example of an encryption process in the seventh embodiment of the present invention.

As described above, according to this embodiment, the encryption process of the profile appended with the output limitation parameter is executed in accordance with the flow chart shown in FIG. 16.

Figure 17:
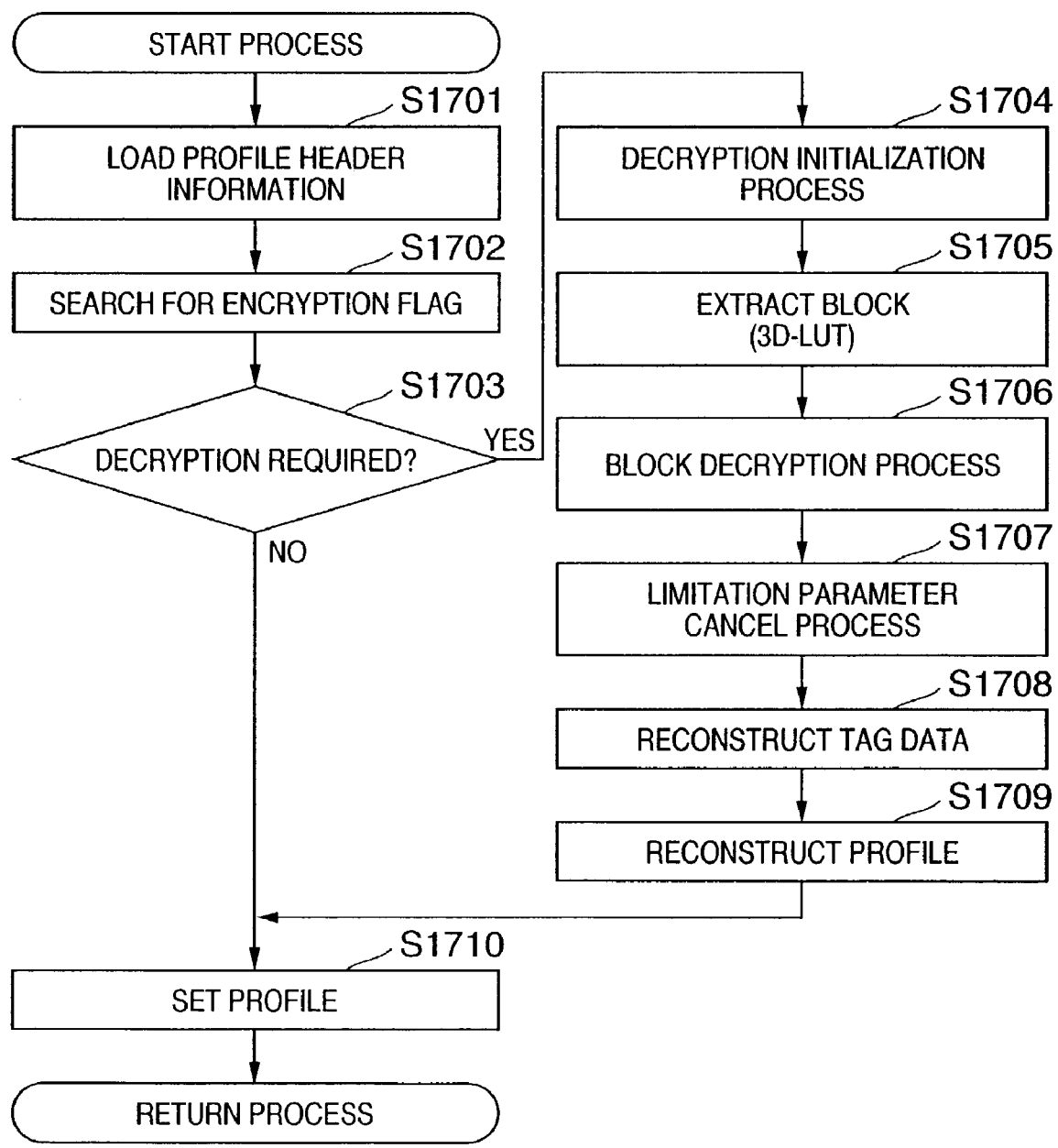
FIG. 17 is a flow chart showing an example of a decryption process in the seventh embodiment of the present invention.

In this embodiment, if it is determined at the beginning of the print process that the set ICC profile has been encrypted, a decryption process of that profile is executed in this system. The decryption process of this embodiment will be described below with reference to the flow chart in FIG. 17.

In step S1701, the ICC profile set for the print process is loaded. In step S1702, the profile is searched for its encryption flag. It is then determined in step S1703 based on that encryption flag whether or not the profile must undergo a decryption process. That is, if the encryption flag indicates that the profile has already been encrypted, it is determined that the profile requires a decryption process.

If it is determined that the decryption process is required, a general initialization process required for the decryption process is executed in step S1704. After that, blocks to be decrypted are extracted in step S1705, and are decrypted in step S1706.

In step S1707, a limitation parameter cancel process is executed. In this embodiment, since the 50% output limitation is set in encrypted tag data, the tag data undergoes this cancel process to restore a state that allows 100% output.

Since the limitation parameter is canceled from the decrypted block data, tag data of the profile are reconstructed in step S1708. After the profile is reconstructed using the reconstructed tag data in step S1709, the decrypted ICC profile is set in this system in step S1710.

Note that the ICC profile decrypted in this embodiment is mapped only on an internal resource (work memory or the like) on which this system is running, so as not to be referred to externally.

As described above, according to this embodiment, a parameter that limits the total ink amount in the print process is appended to an ICC profile, and that ICC profile is then encrypted. Hence, even when this profile is used in a system which has no profile decryption function, a print process with minimum image quality can be guaranteed without exceeding the restriction of the total ink amount in a printer engine of that system.

<Eighth Embodiment>

In this embodiment, an ICC profile is further compressed, and a parameter that limits the total ink amount in the print process is appended to that ICC profile upon encryption. The eighth embodiment of the present invention will be described below.

Since the arrangement and GUI of the printing system in the eighth embodiment are the same as those in the first described above, a description thereof will be omitted.

The eighth embodiment is characterized in that an ICC profile undergoes a compression process prior to an encryption process by appending an output limitation parameter as in the seventh embodiment.

The encryption process of an ICC profile in the eighth embodiment will be described below with reference to the flow chart shown in FIG. 18.

In step S1801, a profile to be encrypted is loaded. Tag data to be encrypted is extracted in step S1802, and it is checked in step S1803 if that data can be encrypted. As a practical checking method, data are read out in turn from the first byte of a part to be examined, and if these data have a given regularity, it is determined that the profile is not encrypted; otherwise, it is determined that the profile has been encrypted. Alternatively, an encryption flag may be referred to as in the seventh embodiment.

If the profile cannot be encrypted, the process ends immediately; otherwise, the flow advances to step S1804 to check if that data can be compressed. If the data cannot be compressed, the flow advances to step S1807; otherwise, the flow advances to step S1805 to execute a compression process.

The file size is adjusted in correspondence with a change in data size as a result of compression in step S1806. More specifically, since the size of the 3D-LUT has changed, the number of data grids is changed to match the data size after compression. At this time, in order to adjust alignment of the data size, dummy data are appended as needed. Note that the original number of grids is saved by embedding it in encrypted data in data blocks in the subsequent encryption process.

In step S1807, a general initialization process required for encryption is executed. In step S1808, blocks to be encrypted (3D-LUT) are extracted. In step S1809, the extracted blocks are encrypted as needed to generate an encrypted block group. Note that the encryption scheme used in this step is not particularly limited, and every known encryption schemes can be applied.

In step S1810, an output value limit parameter is generated so as to reduce the load on a printer engine even when the encrypted data is used without being decrypted. In the eighth embodiment as well, since the total ink amount in the print process is not limited due to encryption, 30% output limitation is uniformly applied to C, M, Y, and K values. Such output limitation can be implemented by adjusting linear LUT data in tag data.

In step S1811, encrypted tag data is generated by combining the encrypted block data group and the limitation parameter. In step S1812, the profile is reconstructed using the encrypted tag data.

In order to save the encrypted ICC profile, which is reconstructed in this way, it is checked in step S1813 if the loaded ICC profile itself is overwritable. Only when it is determined that the file itself is overwritable, the profile is updated in step S1814.

Figure 18:
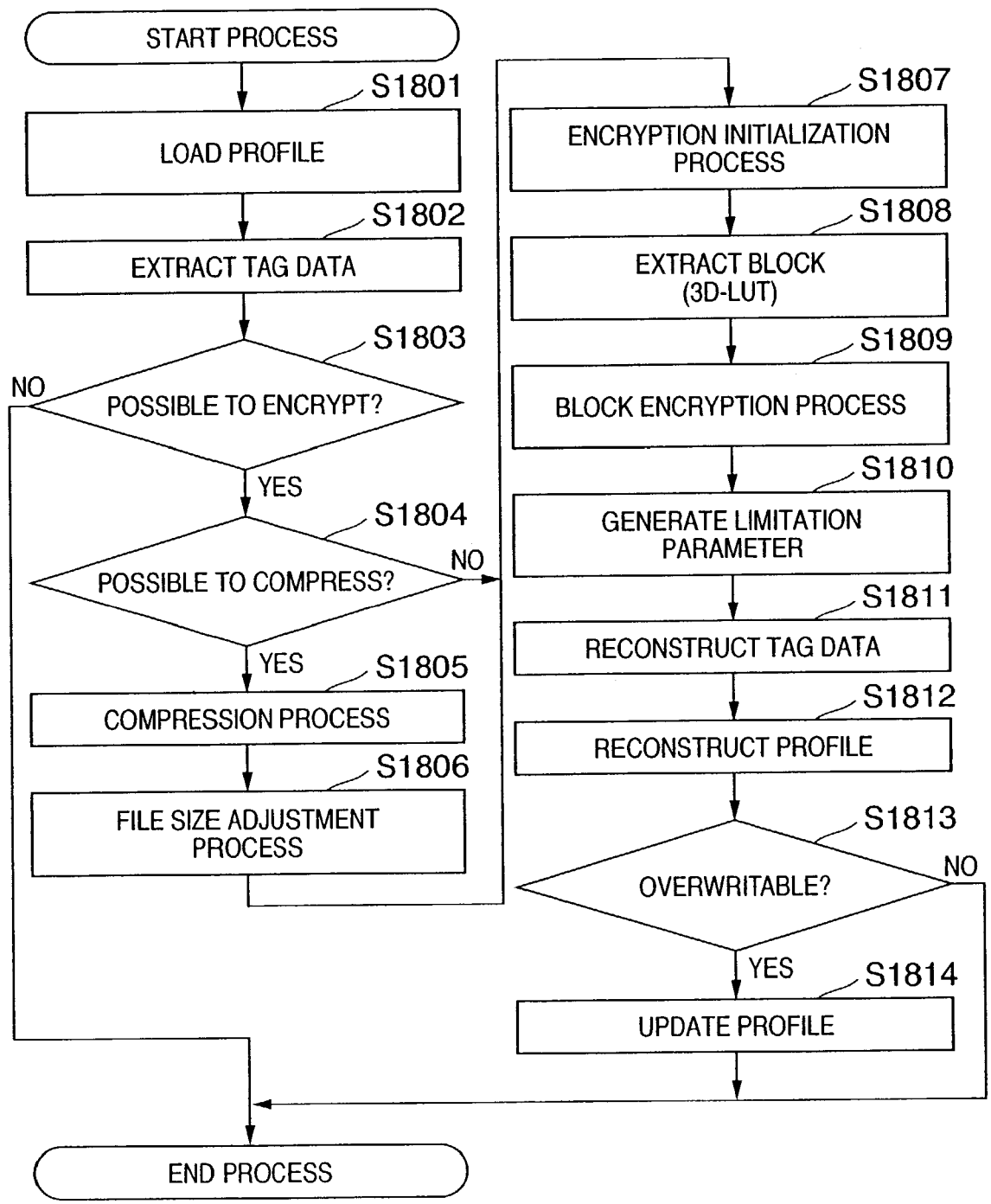
FIG. 18 is a flow chart showing an example of an encryption process in the eighth embodiment of the present invention.

As described above, according to the eighth embodiment, the compression process of a profile and the encryption process of the compressed profile appended with the output limitation parameter are executed in accordance with the flow chart shown in FIG. 18.

Figure 19:
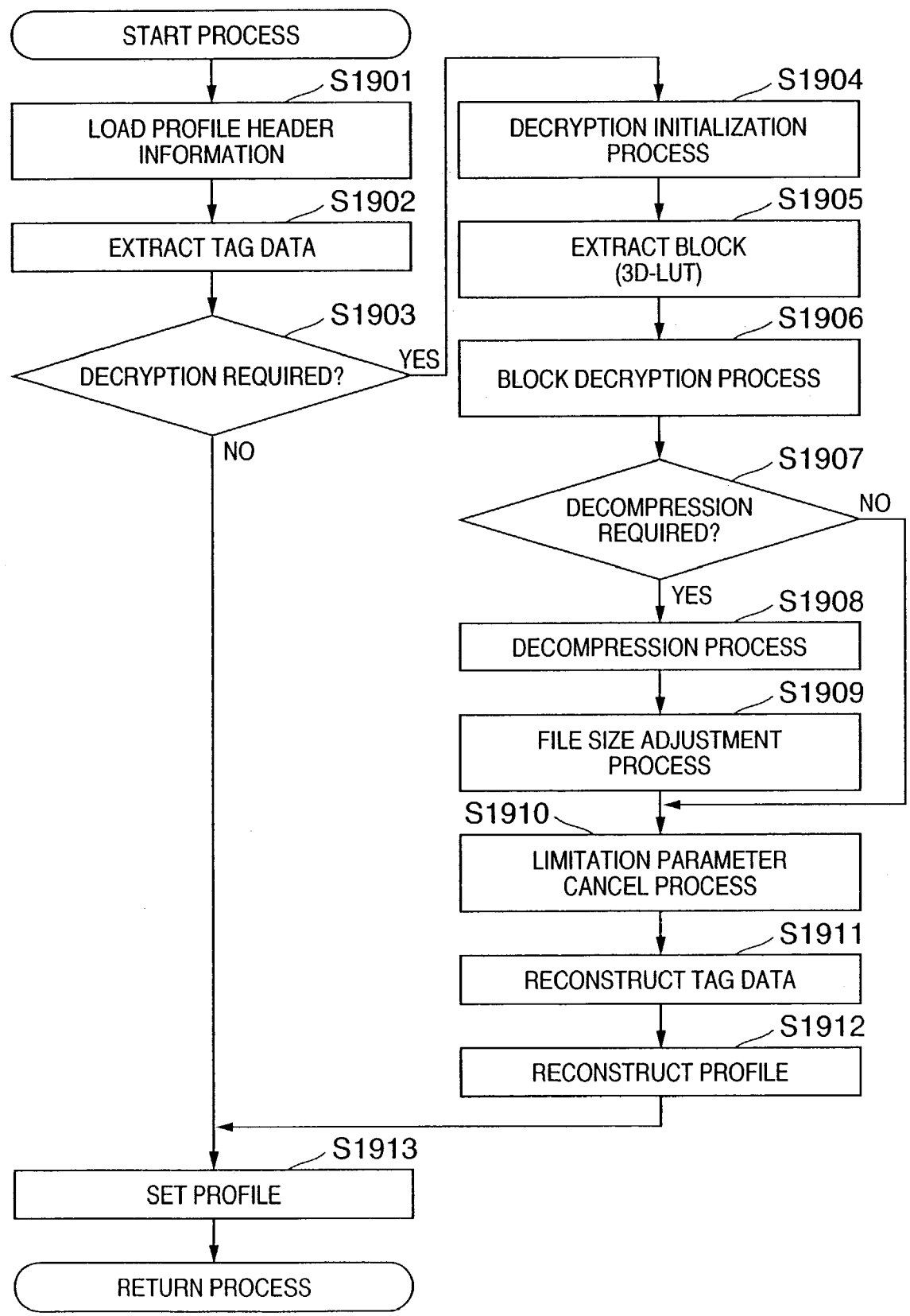
FIG. 19 is a flow chart showing an example of a decryption process in the eighth embodiment of the present invention.

The decryption process in the eighth embodiment will be described below with reference to the flow chart of FIG. 19.

In step S1901, the ICC profile set for the print process is loaded. In step S1902, tag data to be decrypted is extracted. It is then checked in step S1903 if that data must be decrypted. More specifically, data are read out in turn from the first byte of a part to be examined of the profile. If these data have a given regularity, since the data is not encrypted, it is determined that the data need not be decrypted; otherwise, since the data has been encrypted, it is determined that the data must be decrypted. Alternatively, an encryption flag may be referred to as in the first embodiment.

If it is determined that the data must be decrypted, a general initialization process required for decryption is executed in step S1904. After that, blocks to be decrypted (3D-LUT) are extracted in step S1905. In step S1906, the extracted blocks are decrypted. At the same time, the original grid number information is extracted.

It is checked in step S1907 if the decrypted profile is compressed data, i.e., if that profile must undergo a decompression process. If no decompression process is required as a result of checking, the flow jumps to step S1910; otherwise, the flow advances to step S1908 to execute a decompression process. Then, the file size is adjusted in step S1909. After the decompression process in step S1908, a dummy data group is discarded as needed.

In step S1910, a limitation parameter cancel process is executed. In the eighth embodiment, since the 30% output limitation is set in encrypted tag data, the tag data undergoes this cancel process to restore a state that allows 100% output.

Since the limitation parameter is canceled from the decrypted block data, tag data of the profile are reconstructed in step S1911. After the profile is reconstructed using the reconstructed tag data in step S1912, the decrypted ICC profile is set in this system in step S1913.

Note that the ICC profile decrypted in the eighth embodiment is mapped only on an internal resource (work memory or the like) on which this system is running, so as not to be referred to externally.

As described above, according to the eighth embodiment, after an ICC profile is compressed, a parameter that limits the total ink amount in the print process is appended to the ICC profile, and that ICC profile is then encrypted. Hence, even when this profile is used in a system which has no profile decryption function, a print process with minimum image quality can be guaranteed without exceeding the restriction of the total ink amount in a printer engine of that system. Furthermore, since the final file size can be reduced, encryption more suited to delivery onto the network can be implemented.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the described embodiments and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above described embodiments are realized by executing the program codes which are read by a computer, the present invention includes a case where an OS (operating system) or the like working on the computer performs a part or entire processes in accordance with designations of the program codes and realizes functions according to the above described embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above described embodiments.

In a case where the present invention is applied to the aforesaid storage medium, the storage medium stores program codes corresponding to the flowcharts described in the embodiments.

The present invention is not limited to the above embodiments and various changes and modifications can be made within the spirit and scope of the present invention. Therefore to apprise the public of the scope of the present invention, the following claims are made.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. An image processing apparatus for encrypting a profile for color matching, comprising:
   a table generation unit for generating a table which stores change information of the profile;
   a profile change unit for changing data in the profile on the basis of the table; and
   a encryption unit for encrypting the table by a predetermined algorithm,
   wherein said profile change unit embeds information indicating that the profile has already been changed in tag data of the profile that has been changed on the basis of the table.

2. The apparatus according to claim 1, wherein said table generation unit stores, in the table, deviation amount information of the data in the profile, information indicating a processing order and information indicating a data location, respectively, and generates the information indicating the data location and the deviation amount information as random values within predetermined ranges, and
   wherein said profile change unit applies an operation process based on the deviation amount information to the data in the profile.

3. The apparatus according to claim 1, further comprising:
   a storage unit for storing a plurality of profiles;
   a selector for selecting a profile to be encrypted from said storage means; and
   a profile update unit for updating a profile stored in storage unit by the profile, internal data of which has been changed by said profile change means.

4. The apparatus according to claim 1, further comprising:
   a decryption unit for decrypting the table encrypted by said encryption unit; and
   a profile restoration unit for restoring, on the basis of the table, values before change by said profile change unit from the internal data of the profile, which has been changed by said profile change unit.

5. The apparatus according to claim 4, wherein said profile restoration unit restores the values before change by applying an operation process opposite to the operation process executed by said profile change unit to the profile, the internal data of which has been changed by said profile change unit.

6. The apparatus according to claim 4, wherein said decryption unit and said profile restoration unit are enabled when tag data of the profile contains information indicating that the profile has already been changed.

7. The apparatus according to claim 4, further comprising:
   a color matching unit for executing color matching using the profile restored by said profile restoration unit; and
   an image output device for outputting image data after color matching by said color matching unit.

8. A method of controlling an image processing apparatus for encrypting a profile for color matching, comprising:
   a table generation step of generating a table which stores change information of the profile;
   a profile change step of changing data in the profile on the basis of the table; and
   an encryption step of encrypting the table by a predetermined algorithm,
   wherein, in said profile change step, information indicating that the profile has already been changed in tag data of the profile that has been changed on the basis of the table is embedded.

9. An image processing apparatus for encrypting a profile for color matching, comprising:
   a tag selection unit for selecting tag data to be encrypted from a plurality of tag data in the profile; and
   an encryption unit for encrypting the tag data selected by said tag selection unit of the plurality of tag data in the profile.

10. The apparatus according to claim 9, further comprising:
    a storage unit for storing a plurality of profiles; and
    a selection unit for selecting a profile to be encrypted from said storage means,
    wherein said tag selection unit displays the plurality of tag data in the profile as a list, and selects the tag data to be encrypted from the list.

11. The apparatus according to claim 9, wherein said encryption unit comprises:
    a table generation unit for generating a table which stores change information of the tag data;

a tag data change unit for changing the tag data on the basis of the table; and a table encryption unit for encrypting the table by a predetermined algorithm.

12. The apparatus according to claim 11, wherein said table generation unit stores, in the table, bit manipulation information of the tag data, information indicating a processing order and information indicating a data location, respectively, and generates the information indicating the data location and the bit manipulation information as random values within predetermined ranges, and said tag data change unit applies a bit manipulation based on the bit manipulation information to the tag data.

13. The apparatus according to claim 11, wherein said tag data change unit embeds information indicating that the tag data has already been changed in the tag data that has been changed on the basis of the table.

14. The apparatus according to claim 11, further comprising:

a table decryption unit for decrypting the table which has been encrypted by said table encryption unit; and a tag data restoration unit for restoring values before change by said tag data change unit from the tag data which has been changed by said tag data change unit, by applying a manipulation opposite to the bit manipulation executed by said tag data change unit to the tag data which has been changed by said tag data change unit, on the basis of the bit manipulation information stored in the table, wherein said table decryption unit and said tag data restoration unit are enabled when the tag data contains information indicating that the tag data has been changed.

15. The apparatus according to claim 9, further comprising:

a profile update unit for updating a profile stored in storage unit by the profile, the tag data of which has been encrypted by said encryption unit.

16. The apparatus according to claim 9, further comprising:

a profile restoration unit for restoring the profile by decrypting the tag data of the profile, which has been encrypted by said encryption means;

a color matching unit for executing color matching using the profile restored by said profile restoration unit; and an image output device for outputting image data after color matching by said color matching unit.

17. A method of controlling an image processing apparatus for encrypting a profile for color matching, comprising:

a tag selection step of selecting tag data to be encrypted from a plurality of tag data in the profile; and an encryption step of encrypting the tag data selected in the tag selection step of the plurality of tag data in the profile.

18. An image processing apparatus for encrypting a profile for color matching, comprising:

a determination unit for determining whether or not the profile has been encrypted;

and an encryption unit for, when said determination unit determines that the profile has not already been encrypted, causing the image processing apparatus to encrypt the profile by a predetermined algorithm.

19. The apparatus according to claim 18, wherein said determination unit determines that the profile has been encrypted when an array of data to be encrypted has a regularity.

20. The apparatus according to claim 18, further comprising:

a storage unit for storing a plurality of profiles;

a selection unit for selecting a profile to be encrypted from said storage unit; and a profile update unit for updating a profile stored in storage unit by the profile which has been encrypted by said encryption unit, wherein said encryption unit sets an encryption flag indicating that encryption has already been done in the profile and encrypts the profile for respective blocks, and said determination unit determines that the profile cannot be encrypted if the encryption flag indicates that encryption has already been done.

21. The apparatus according to claim 18, further comprising:

a decryption unit for decrypting the profile which has been encrypted by said encryption unit;

a decryption determination unit for determining whether or not the profile is to be decrypted;

a color matching unit for executing color matching using the profile decrypted by said decryption unit; and an image output device for outputting image data after color matching by said color matching unit, wherein said decryption unit decrypts the profile when said decryption determination unit determines that the profile is to be decrypted.

22. The apparatus according to claim 18, further comprising:

a compression unit for, when said determination unit determines that the profile can be encrypted, executing a compression process of the profile;

a decryption unit for decrypting the profile encrypted by said encryption unit; and a decompression unit for decompressing the profile decrypted by said decryption unit, wherein said encryption unit encrypts the profile compressed by said compression unit by the predetermined algorithm.

23. A method of controlling an image processing apparatus for encrypting a profile for color matching, comprising:

a determination step of determining whether or not the profile has been encrypted;

and an encryption step of, when it is determined in the determination step that the profile has not already been encrypted, causing the image processing apparatus to encrypt the profile by a predetermined algorithm.

24. An image processing apparatus for encrypting a profile for color matching, comprising:

a determination unit for determining whether or not the profile has been encrypted;

an encryption unit for, when said determination unit determines that the profile has not already been encrypted, encrypting the profile by a predetermined algorithm;

a parameter generation unit for generating a limitation parameter for limiting an output value after color conversion by the profile; and a parameter appending unit for appending the limitation parameter to the profile encrypted by said encryption unit.

25. The apparatus according to claim 24, wherein said parameter generation unit generates a parameter that suppresses the output value of the profile to a predetermined ratio.

26. The apparatus according to claim 25, wherein said encryption unit encrypts a three-dimensional table in the profile, and
said parameter generation unit suppresses the output value of the profile by adjusting a linear table in the profile.

27. The apparatus according to claim 25, further comprising:
a storage unit for storing a plurality of profiles;
a selection unit for selecting a profile to be encrypted from said storage unit; and
a profile update unit for updating a profile stored in storage unit by the profile which has been encrypted by said encryption unit,
wherein said encryption unit sets an encryption flag indicating that encryption has already been done in the profile and encrypts the profile for respective blocks, and said determination unit determines that the profile can be encrypted when an array of data to be encrypted has a regularity and the profile cannot be encrypted if the encryption flag indicates that encryption has already been done.

28. The apparatus according to claim 24, further comprising:
a decryption unit for decrypting the profile which has been encrypted by said encryption unit; and
a limitation cancel unit for canceling the limitation imposed by the limitation parameter appended to the profile.

29. The apparatus according to claim 28, further comprising:
a decryption determination unit for determining whether or not the profile is to be decrypted;
a color matching unit for executing color matching using the profile decrypted by said decryption unit; and
an image output device for outputting image data after color matching by said color matching unit,
wherein said limitation cancel unit restores a value before limitation imposed by the limitation unit from the output value after color conversion by the profile, and said decryption unit decrypts the profile when said decryption determination unit determines that the profile is to be decrypted.

30. The apparatus according to claim 24, further comprising:
a compression unit for, when said determination unit determines that the profile can be encrypted, executing a compression process of the profile, and
wherein said encryption unit encrypts the profile compressed by said compression unit by the predetermined algorithm.

31. The apparatus according to claim 30, further comprising:
a decryption unit for decrypting the profile encrypted by said encryption unit; and
a decompression unit for decompressing the profile decrypted by said decryption unit.

32. An image processing system which connects a plurality of image processing apparatuses via a network, including at least a first and a second image processing apparatus, said first image processing apparatus for encrypting a profile for color matching, comprising:
a determination unit for determining whether or not a profile has been encrypted;
an encryption unit for, when said determination unit determines that the profile has not already been encrypted, encrypting the profile by a predetermined algorithm;
a parameter generation unit for generating a limitation parameter for limiting an output value after color conversion by the profile;
a parameter appending unit for appending the limitation parameter to the profile encrypted by said encryption unit; and a transmission unit for transmitting the profile appended with the limitation parameter by said parameter appending unit to a second image processing apparatus via the network, and
said second image processing apparatus comprising:
a reception unit for receiving the encrypted profile from said transmission unit;
a decryption unit for decrypting the encrypted profile; and
a limitation cancel unit for canceling a limitation imposed by the limitation parameter appended to the profile.

33. An image processing apparatus for encrypting a profile for color matching, comprising:
a table generation unit for generating a table which stores change information of the profile;
a profile change unit for changing data in the profile on the basis of the table;
an encryption unit for encrypting the table by a predetermined algorithm;
a decryption unit for decrypting the table encrypted by said encryption unit; and
a profile restoration unit for restoring, on the basis of the table, values before change by said profile change unit from the internal data of the profile which has been changed by said profile change unit.

34. A method of controlling an image processing apparatus for encrypting a profile for color matching, comprising:
a table generation step of generating a table which stores change information of the profile;
a profile change step of changing data in the profile on the basis of the table;
an encryption step of encrypting the table by a predetermined algorithm;
a decryption step of decrypting the table encrypted in said encryption step; and
a profile restoration step of restoring, on the basis of the table, values before change in said profile change step from the internal data of the profile which has been changed in said profile change step.

* * * * *

UNITED STATES PATENT AND TRADEMARK OFFICE
CERTIFICATE OF CORRECTION

PATENT NO.        : 7,212,635 B2
APPLICATION NO. : 10/453489
DATED             : May 1, 2007
INVENTOR(S)       : Naoyuki Nishikawa It is certified that error appears in the above-identified patent and that said Letters Patent is hereby corrected as shown below:

On the Title Page Item (56) OTHER PUBLICATIONS

"(5) Eiji Okamoto," should read --Eiji Okamoto,--; and
"Englishi" should read --English--.

COLUMN 4

Line 34, "schemes" should read --scheme--.

COLUMN 7

Line 51, "only-on" should read --only on--.

COLUMN 9

Line 5, "schemes" should read --scheme--.

COLUMN 10

Line 1, "schemes" should read --scheme--.

COLUMN 12

Line 12, "schemes" should read --scheme--.

COLUMN 13

Line 59, "schemes" should read --scheme--.

COLUMN 15

Line 58, "a encryption" should read --an encryption--.

COLUMN 17

Line 59, "encrypted;" should read --encrypted; and--; and
Line 60, "and" should be deleted.

UNITED STATES PATENT AND TRADEMARK OFFICE
CERTIFICATE OF CORRECTION

PATENT NO. : 7,212,635 B2
APPLICATION NO. : 10/453489
DATED : May 1, 2007
INVENTOR(S) : Naoyuki Nishikawa It is certified that error appears in the above-identified patent and that said Letters Patent is hereby corrected as shown below:

COLUMN 18

Line 45, "encrypted;" should read --encrypted; and--; and
Line 46, "and" should be deleted.

Signed and Sealed this

Fifteenth Day of April, 2008

JON W. DUDAS
*Director of the United States Patent and Trademark Office*